(12) United States Patent
Pressey

(10) Patent No.: US 11,071,995 B2
(45) Date of Patent: Jul. 27, 2021

(54) LATERAL APPLICATOR KIT FOR A PIPE

(71) Applicant: Dennis Pressey, Pemberton, NJ (US)

(72) Inventor: Dennis Pressey, Pemberton, NJ (US)

(73) Assignee: TOOL DEN, Pemberton, NJ (US)

( * ) Notice: Subject to any disclaimer, the term of this patent is extended or adjusted under 35 U.S.C. 154(b) by 0 days.

(21) Appl. No.: 17/119,963

(22) Filed: Dec. 11, 2020

(65) Prior Publication Data

US 2021/0178418 A1    Jun. 17, 2021

Related U.S. Application Data

(60) Provisional application No. 62/947,725, filed on Dec. 13, 2019.

(51) Int. Cl.
| | |
|---|---|
| *B05C 1/02* | (2006.01) |
| *B05C 7/06* | (2006.01) |
| *B65D 47/04* | (2006.01) |
| *B05C 7/02* | (2006.01) |
| *B05D 7/22* | (2006.01) |

(52) U.S. Cl.
CPC ............ *B05C 1/022* (2013.01); *B05C 7/02* (2013.01); *B05C 7/06* (2013.01); *B05D 7/225* (2013.01); *B65D 47/043* (2013.01); *B05D 2254/06* (2013.01)

(58) Field of Classification Search
CPC .......... B05C 1/002; B05C 7/06; B05C 1/022; B05C 7/08; B05C 7/02; B05B 7/08; Y10S 118/10; Y10S 118/11; Y10S 118/13; B05D 7/225; B05D 2254/06; B25B 27/02; B65D 47/043
USPC ....... 118/214, 254, 255, 264, 407, 304, 317; 206/229
See application file for complete search history.

(56) References Cited

U.S. PATENT DOCUMENTS

| | | | | |
|---|---|---|---|---|
| 5,678,684 | A | * | 10/1997 | Wright ..................... B44D 3/12 206/1.8 |
| 2009/0019680 | A1 | * | 1/2009 | Krohn ..................... F16L 17/00 29/272 |

* cited by examiner

*Primary Examiner* — Laura Edwards

(57) ABSTRACT

A lateral applicator kit for a pipe has a first application unit and a second application unit that are configured to apply a primer material or other substance to the exterior and interior lateral surfaces of a pipe, respectively. The first application unit is configured to receive primer through a supply engagement feature, which is in fluid communication with a reservoir cavity internal to the first application unit and further in fluid communication with at least one perforated annular wall of an application receptacle configured to receive, and apply primer to, the exterior lateral surface of a pipe. The second application unit is similarly but inversely configured to apply primer to the interior lateral surface of a pipe by receiving primer into a supply receptacle, which is transferred through at least one spout set into and through an annular distributing container connected annularly around the supply receptacle.

13 Claims, 25 Drawing Sheets

LATERAL APPLICATOR KIT FOR A PIPE

The current application claims a priority to the U.S. Provisional Patent application Ser. No. 62/947,725 filed on Dec. 13, 2019.

FIELD OF THE INVENTION

The present invention relates generally to applicator tools. More particularly, the present invention relates to a kit for applying a substance to the surfaces of a pipe.

BACKGROUND OF THE INVENTION

Polyvinyl Chloride (PVC) is the world's third most widely produced synthetic plastic polymer and it is favorable in the production of pipes, hoses, medical devices, and plenty of other household materials. PVC was first synthesized in 1872 and commercially produced in the 1920s, a timeline older than most other plastics available today. The production of this plastic is viable in two counterparts, rigid and flexible, allowing both pipes and hoses to originate from the same material.

During the assemblage of a pipe, multiple segments of PVC of various different shapes and sizes are utilized: elbows (curved at different angles), crosses, tees (fitting with three ends), etc. These are necessary for the pipe to accommodate into the space for which it is intended. These segments are joined at their ends, elongating or changing the direction of the pipe so it can perform its proper function. These pipes will most likely be subjected to intense pressures, highlighting the importance of securely joining the segments together to prevent bursting or ruptures. This is where proper priming of the joints becomes crucial.

When connecting two segments of PVC together tightly enough to withstand significant pressure, the application of a primer is necessary. The use of a primer connects the pipes via a chemical weld, a process where the chemical (primer) softens the pipe, allowing the introduction of pressure applied by the individual to chemically fuse the two pipes together. Without the use of a primer, the PVC pipe will fail to seal properly, creating a fragile structure susceptible to ruptures and bursts. The primer also serves a related purpose of evening out bumps and cracks, along with removing oils, dirt, and other imperfections from the pipes so a proper seal is formed.

Application of the primer is a challenge that requires optimization. The primer comes stored in a can, and is applied by a built-in dauber or brush. Due to the runny consistency of the primer, the dauber fails to mitigate the mess that is created when handling it, and drip prevention is nearly impossible to achieve. To make matters worse, skin contact with the primer can be extremely hazardous, potentially leading to a painful, itchy rash, while repeated exposure can lead to a skin disease called dermatosis. Furthermore, if the primer drips onto unintended surfaces, it proves extremely difficult to remove, especially if it sits on the surface for some time. This will potentially require the disposal of the stained material, where clothing is among the most common victim of primer stain.

When applying the primer, the dauber does not solve the problem of achieving an even and consistent coat around the exterior and interior of the pipes to be adhered. The first contact between the dauber and the pipe will be the point on the pipe at which the most primer is applied. As you brush through the circumference of the pipe, less and less primer will remain on the dauber, leading to a spectrum of primer concentration around the pipe. One consequence introduced by this problem is not having enough primer applied to the area where there is a small crack, and thus not covering it sufficiently to prevent future damage to the pipe. Another consequence is the mess that can occur from using a dauber or brush to apply the primer.

While there is a method to apply the primer to a PVC pipe, the success rate of this process can be dramatically improved, the time necessary for the application can be reduced, and the drip of the primer onto other surfaces at the risk of stains can and should be eliminated. Accordingly, there is an established need for an all-in-one, multi-functional priming tool that is able to apply prime material to both the interior and exterior surfaces of a pipe.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a tool kit for applying a substance to the interior and exterior lateral surfaces of a pipe. More particularly, the present invention is a lateral applicator kit intended to facilitate application of a coating of a viscous substance, such as, but not limited to, PVC primer, glue, or other material to the interior and exterior lateral surfaces of a PVC pipe before an adhesive layer is applied in order to chemically weld the ends of two PVC pipes together. It should be readily understood, however, that the present invention may be alternatively directed to a substance application tool that applies any substance, such as a cleaner or adhesive, and/or any other substance, to the interior, exterior, and in some embodiments, terminal surfaces of a PVC pipe or any other applicable type of pipe. In some instances, the present invention may be referred to as "Primer Pal."

The lateral applicator kit of the present invention is deployed in the form of a pair of individual tool units—a first application unit being configured with a female cylindrical cavity adapted to receive and apply primer material to an exterior lateral surface of a PVC pipe and a second application unit being configured with a male cylindrical member adapted to be inserted into and apply primer to an interior lateral surface of a PVC pipe. Each of the pair of tool units has a primer supply connection being disposed in fluid communication internally through the tool units with the lateral walls of the respective cylindrical primer application members of the tool units. A third application unit may further be comprised in some embodiments, wherein the third application unit may correspond to a dauber cap typically included with canisters of primer or other such substances, and wherein the third application unit may be configured to concentrically and terminally connect to either of the pair of tool unit.

Figure 1:
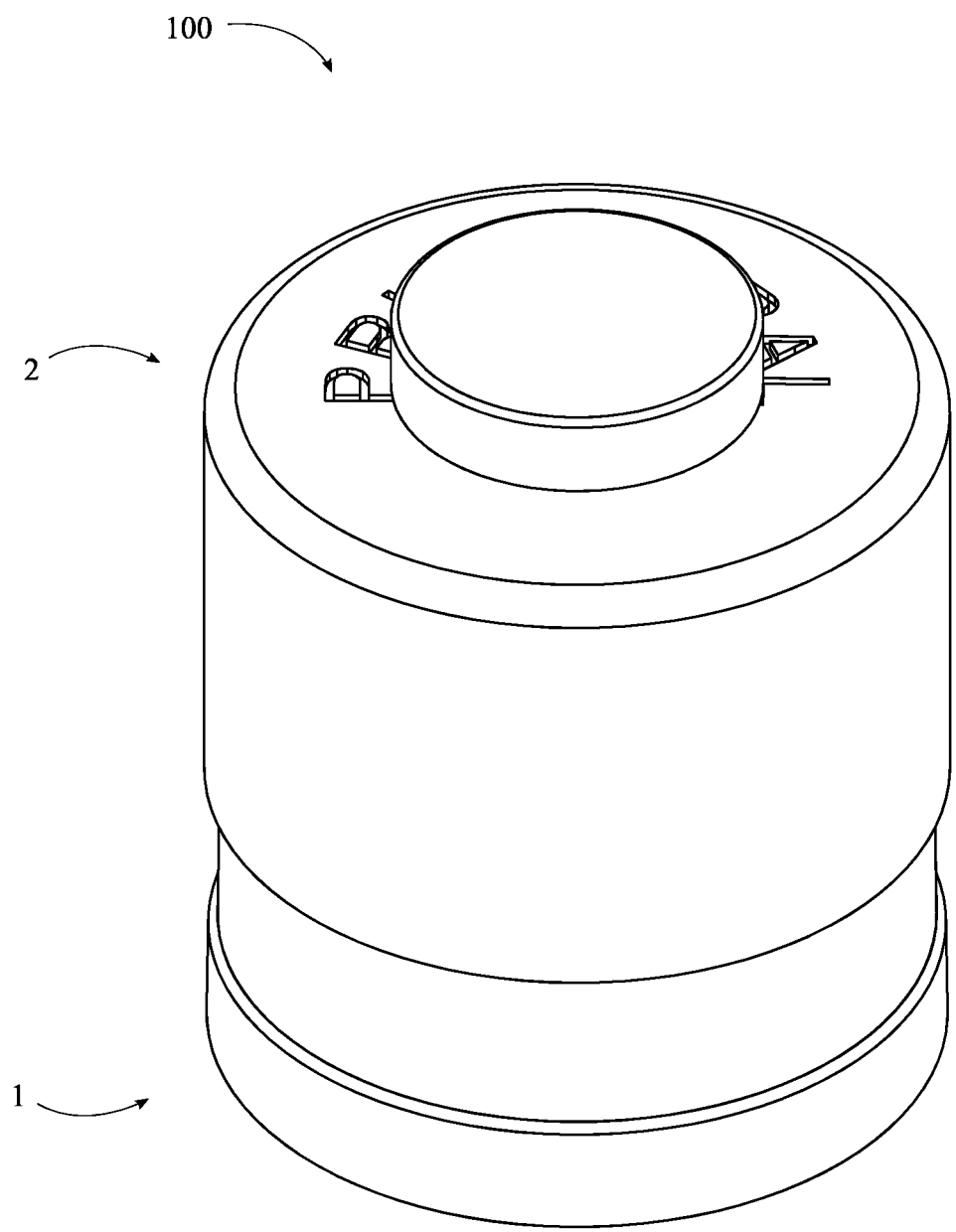
FIG. 1 is a perspective view of the lateral applicator kit of the present invention in an assembled configuration.
Figure 2:
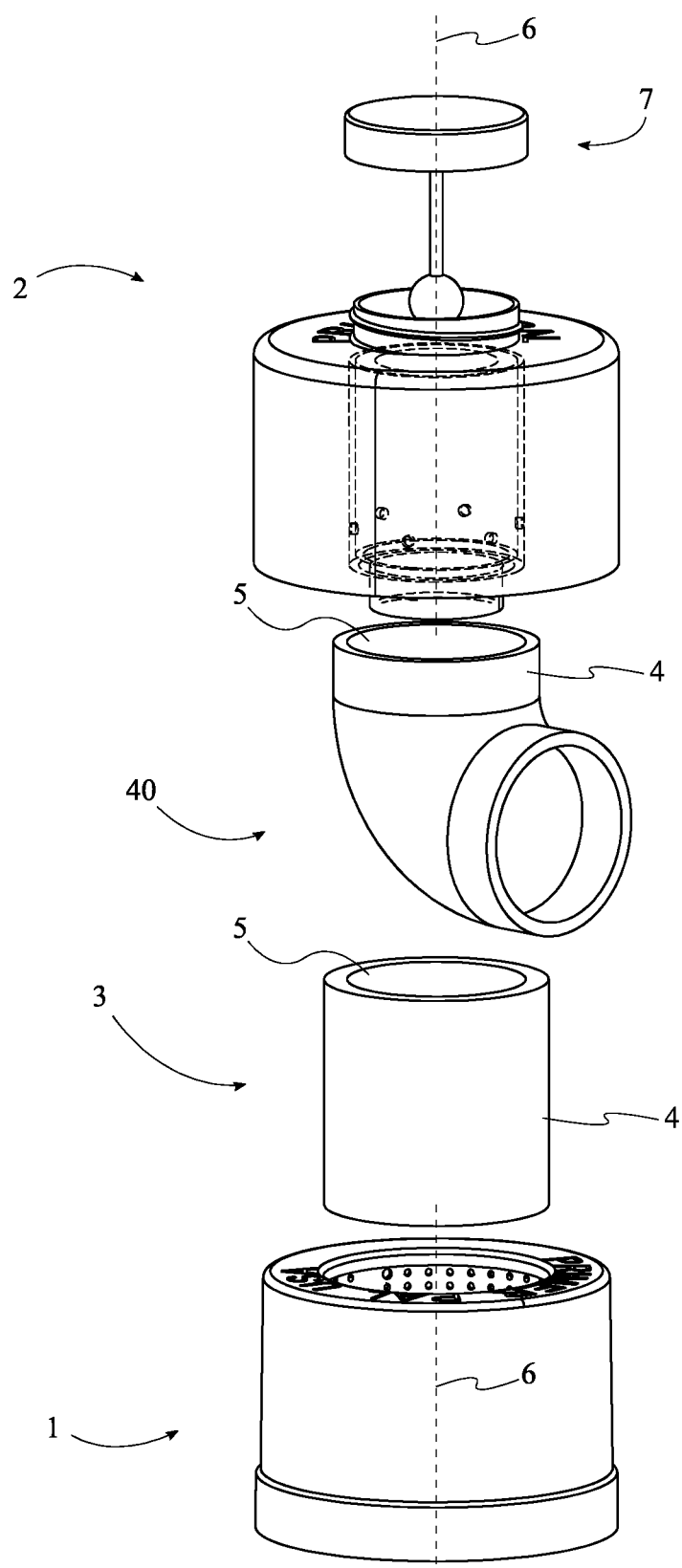
FIG. 2 is a perspective view illustrating a pipe to receive a substance on its exterior and interior lateral surface through use of the present invention.

Generally, referring to FIGS. 1-2, the preferred embodiment of the lateral applicator kit 100 of the present invention comprises a first application unit 1 and a second application unit 2, wherein the first application unit 1 is configured to apply primer material to an exterior lateral surface 4 of a pipe 3 or fitting 40, while the second application unit 2 is configured to apply primer material to an interior lateral surface 5 of a pipe 3 or fitting 40. The first application unit 1 and the second application unit 2 each have generally radial geometry concentrically positioned about a central axis 6. In the preferred embodiment, the first application unit 1 and the second application unit 2 are configured to be interfit or joined with one another to form a single compact assembly, which facilitates storage, packaging, and transport of the lateral applicator kit 100. The present invention may be sized to any desired dimensions in order to accommodate any size of pipe 3 or pipe fitting 40.

Figure 3:
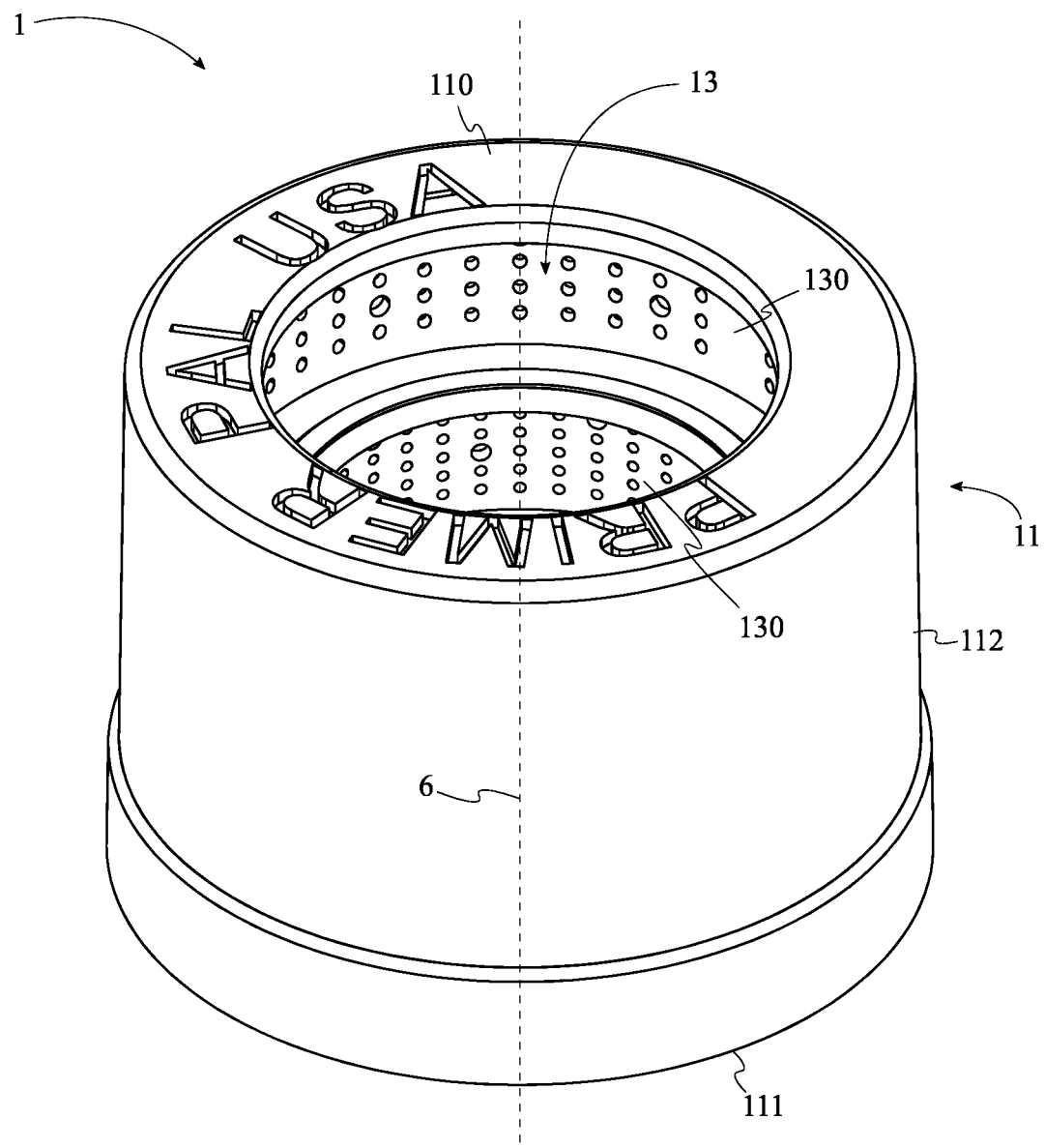
FIG. 3 is a raised perspective view of the first application unit.
Figure 4:
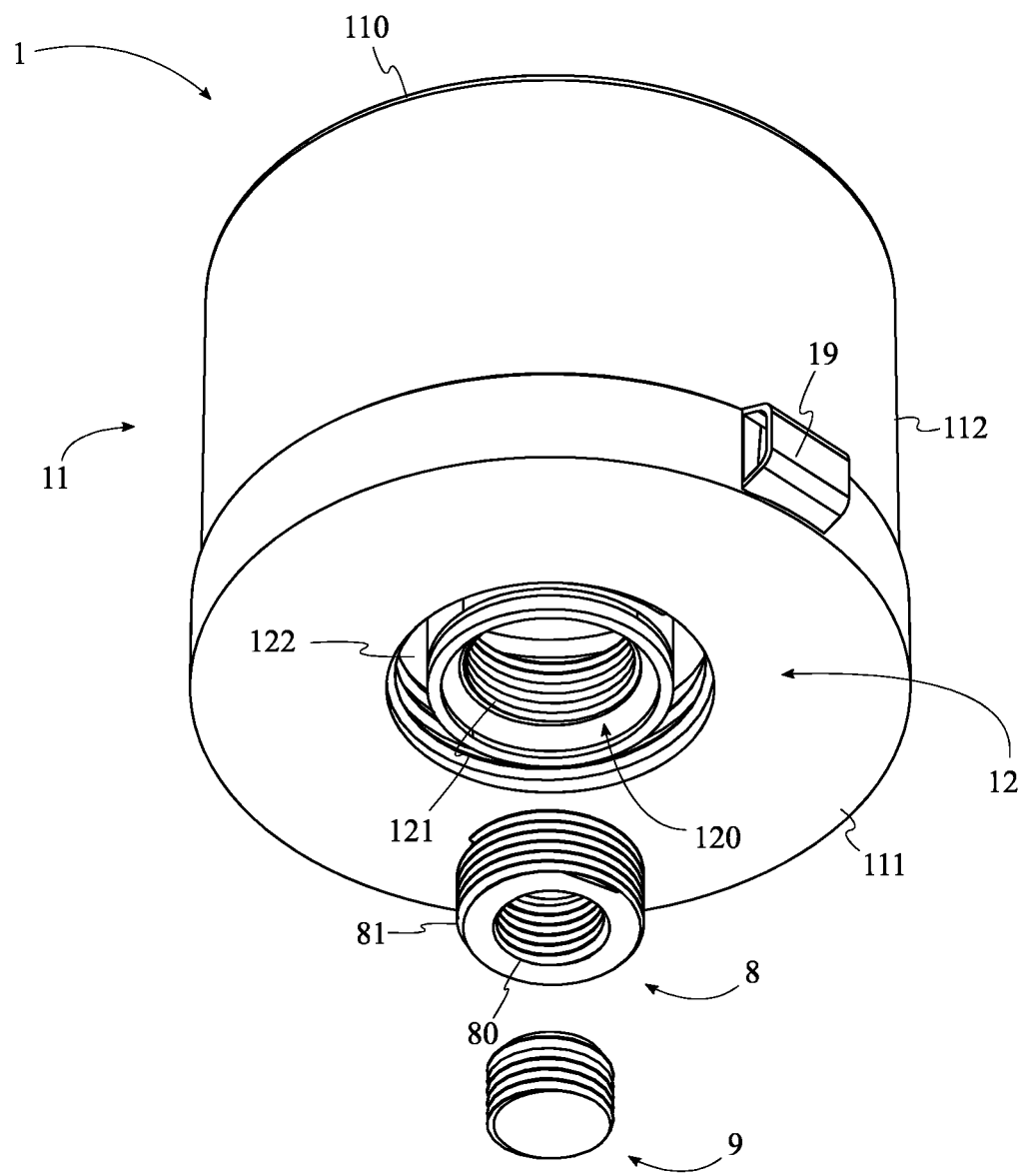
FIG. 4 is a lowered perspective view of the second application unit.
Figure 5:
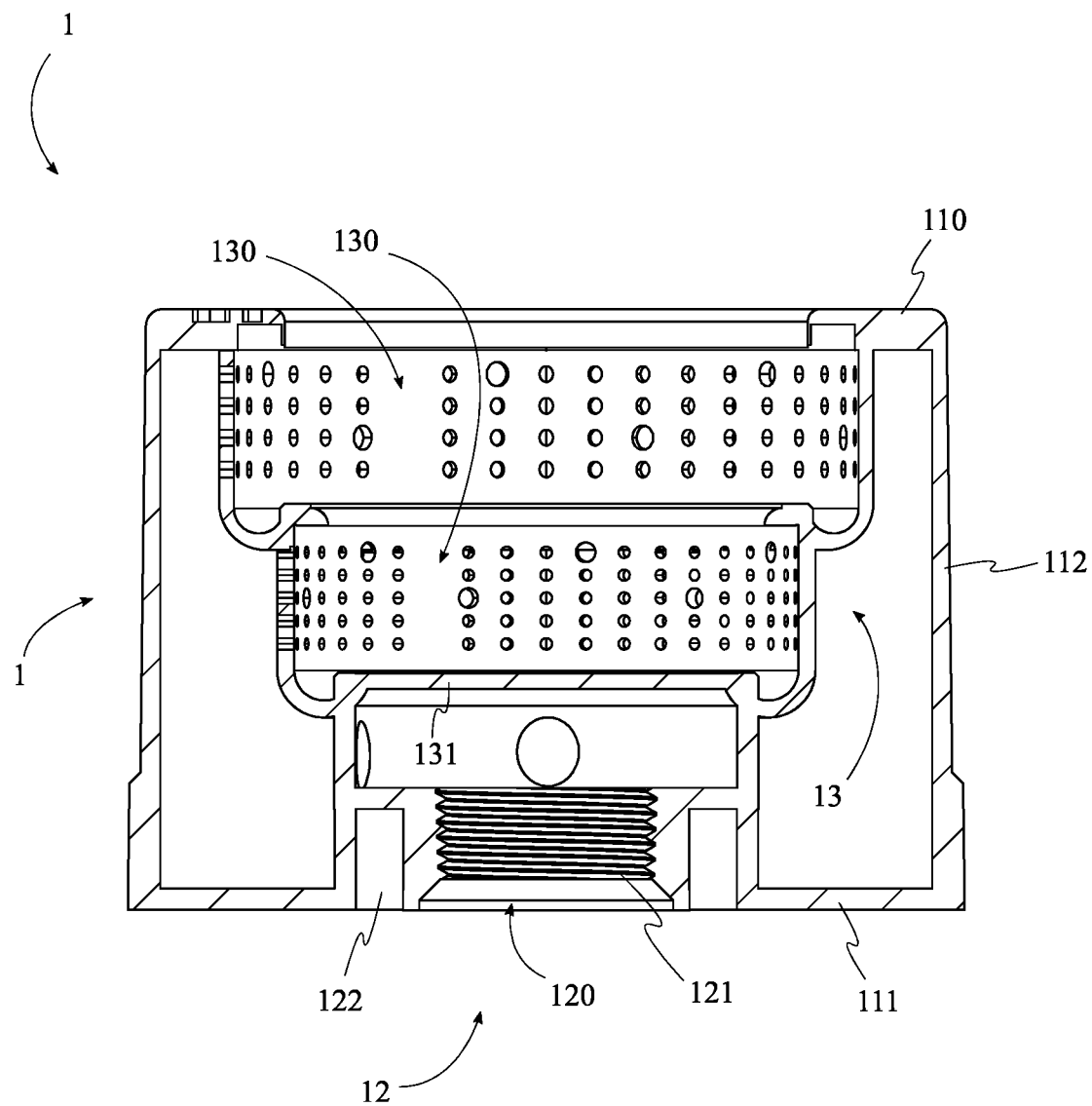
FIG. 5 is a cross-sectional elevation view of the first application unit.

Referring to FIGS. 3-4, the first application unit 1 generally comprises a first unit housing 11, a supply engagement feature 12, and an application receptacle 13. The first unit housing 11 of the first application unit 1 generally constitutes the external structural geometry of the first application unit 1 and serves to support and connect the remaining components of the first application unit 1. The supply engagement feature 12 is integrated into the first unit housing 11; more particularly, the supply engagement feature 12 is integrated into a bottom 111 of the first unit housing 11. The supply engagement feature 12 is adapted to engage a pre-existing canister of PVC primer or another substance in order to receive the primer, which is then supplied to the application receptacle 13.

The application receptacle 13 is a broadly defined sub-component of the first application unit 1, such that the application receptacle 13 is configured to internally receive the end of a pipe 3 in order to apply primer to the external lateral wall of the pipe 3 through lateral contact between the lateral wall of the pipe 3 and the application receptacle 13. The application receptacle 13 is integrated into the first unit housing 11, axially opposite the supply engagement feature 12 along the central axis 6 of the first application unit 1. The application receptacle 13 comprises at least one perforated annular wall 130 and a solid base 131, and the at least one perforated annular wall 130 is perimetrically positioned to the solid base 131. The at least one perforated annular wall 130 serves to deliver the primer material to the exterior lateral surface 4 of the pipe 3. The solid base 131 is a structural component necessary to contain the primer within the first unit housing 11. The supply engagement feature 12 is in fluid communication with the at least one perforated annular wall 130 through the first unit housing 11; alternatively stated, primer received through the supply engagement feature 12 follows an internal path through the first unit housing 11 and arrives at the at least one perforated annular wall 130, where the primer traverses through the perforated annular wall and makes contact with the external lateral surface of the pipe 3 positioned within the application receptacle 13.

In some embodiments, the perforated annular wall 130 may be tapered inward toward the bottom 111 of the first unit housing 11 and constructed of a flexible or semi-flexible material. This configuration enables a tight fit between the exterior lateral surface 4 of the pipe 3 and the perforated annular wall 130, since in order to fully insert the pipe 3 into the application receptacle 13, the pipe 3 must deform the perforated annular wall 130 from its tapered configuration outward into a straight cylindrical shape to match the shape of the pipe 3.

Figure 6:
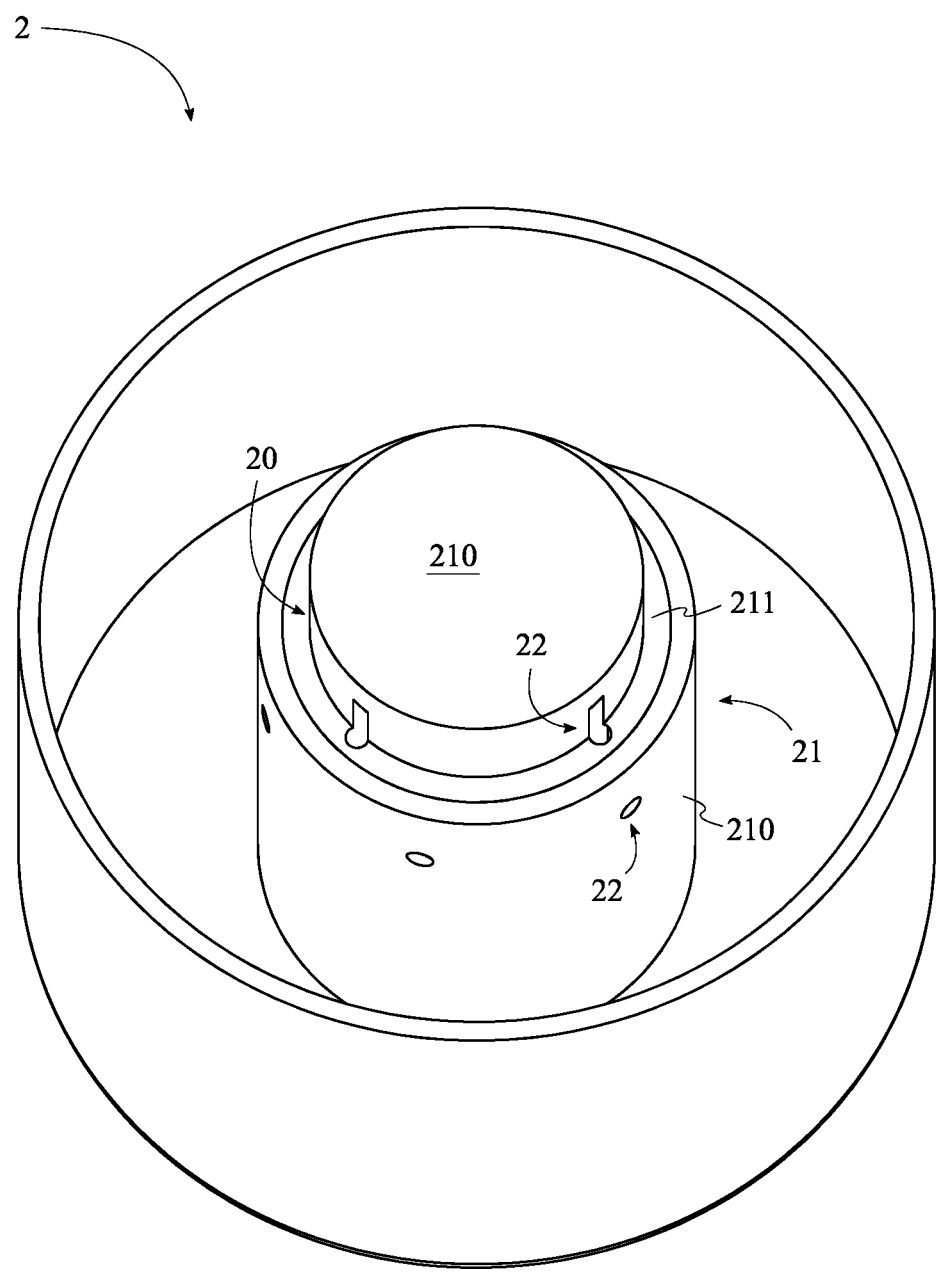
FIG. 6 is a lowered perspective view of the second application unit.
Figure 7:
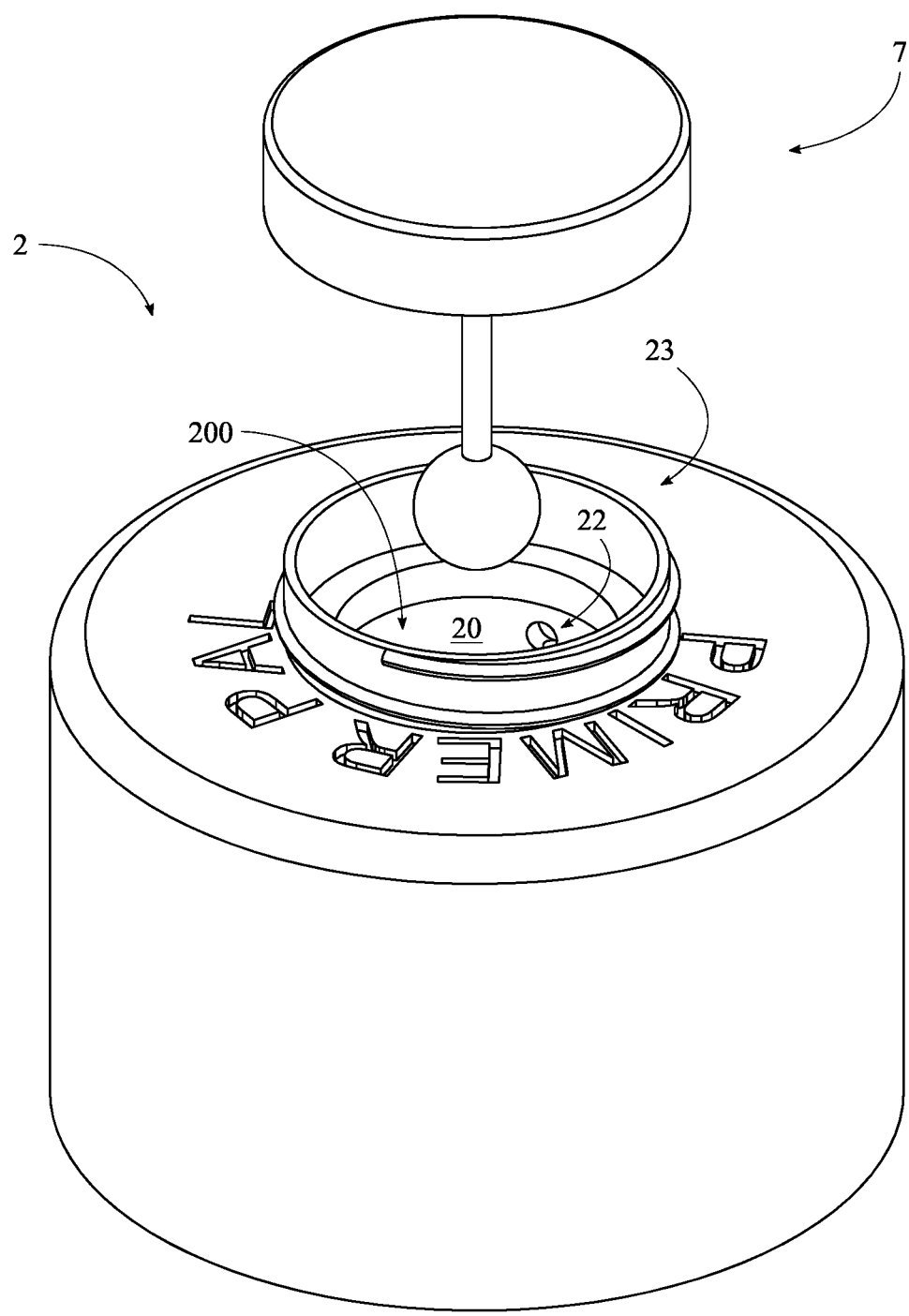
FIG. 7 is a raised perspective view of the second application unit.
Figure 10:
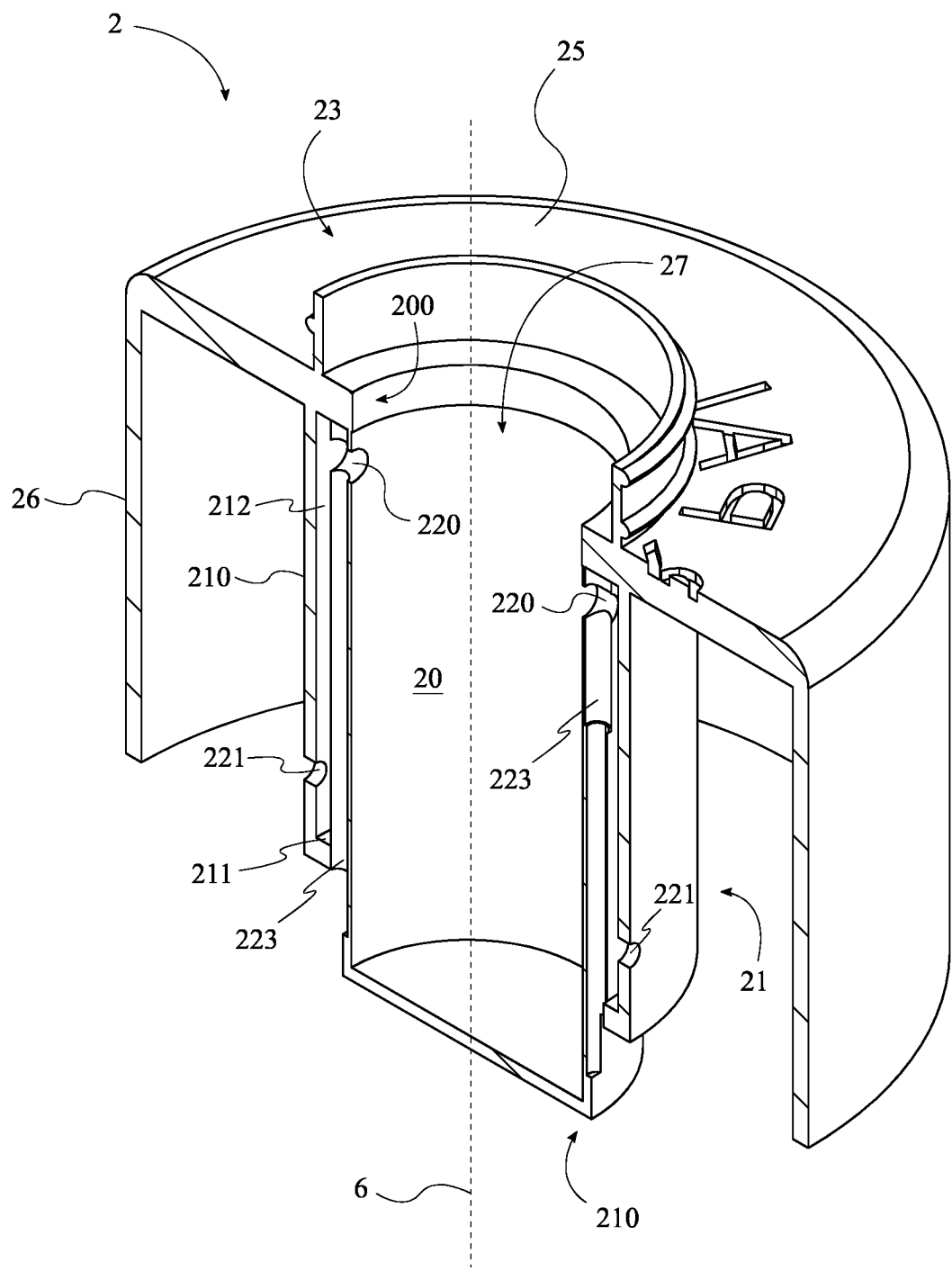
FIG. 10 is a raised perspective cross-sectional view of the second application unit.

Referring to FIGS. 6-7 and 10, the second application unit 2 generally comprises a supply receptacle 20, an annular distributing container 21, and at least one spout set 22. In the preferred embodiment, the second application unit 2 further comprises a supply engagement feature 23 of its own. The annular distributing container 21 is laterally connected to the supply receptacle 20, the at least one spout set 22 is positioned around the supply receptacle 20, and the supply receptacle 20 is disposed in fluid communication with the at least one spout set 22 through the annular distributing container 21. Moreover, the supply engagement feature 23 of the second application unit 2 is integrated into an end of the supply receptacle 20 and may function and be configured similarly to the supply engagement feature 12 of the first application unit 1. In some embodiments, the supply engagement feature 23 of the second application unit 2 may comprise an external threading configured to threadedly receive a dauber cap 7, as shown in FIGS. 1-2 and 7.

The supply receptacle 20 may be understood to be a hollow, cylindrical body with an open end 200 and a closed end 210, wherein the supply engagement feature 23 of the second application unit 2 is integrated into the open end 200 of the supply receptacle 20 of the second application unit 2. The at least one spout set 22 is a group of holes, channels, or other passageways that traverse from a supply space internal to the supply receptacle 20, through the supply receptacle 20 and the annular distributing container 21. Thus, the supply receptacle 20 of the second application unit 2 functions to receive primer through the open end 200 of the supply receptacle 20, or more particularly through the supply engagement feature 23 of the second application unit 2 as appropriate in embodiments comprising the supply engagement feature 23 of the second application unit 2. The received primer is then distributed through the at least one spout set 22 to the annular distributing container 21 to be applied to the interior lateral surface 5 of a pipe 3.

Figure 8:
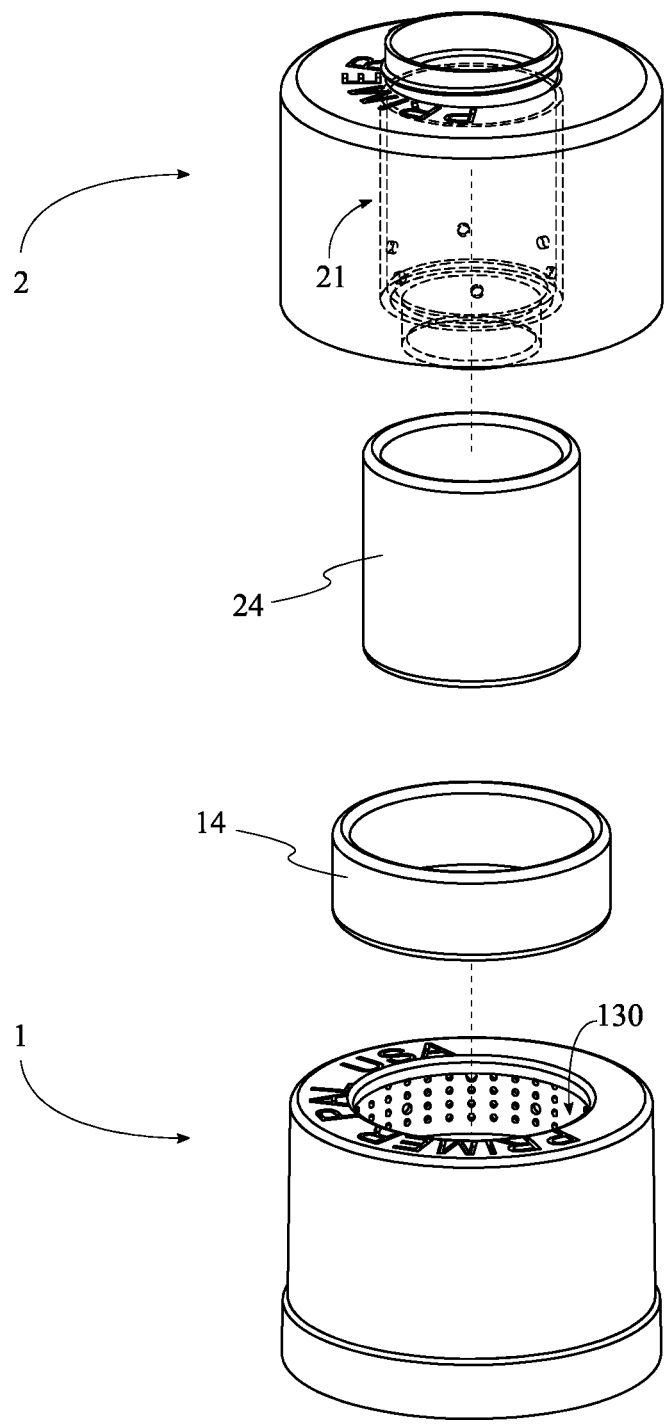
FIG. 8 is an exploded perspective view illustrating the application unit sleeves of the first application unit and the second application unit.

Referring to FIG. 8, in the preferred embodiment, the first application unit 1 further comprises a first unit application sleeve 14, and the second application unit 2 comprises a second unit application sleeve 24. The first unit application sleeve 14 is removably positioned perimetrically within one of the at least one perforated annular wall 130, and the second unit application sleeve 24 is removably positioned around the annular distributing container 21. Preferably, the first unit application sleeve 14 and the second unit application sleeve 24 are constructed from a flexible, absorbent and/or porous material, such as, but not limited to, felt or a similar textile or other absorbent material. However, the material of the first unit application sleeve 14 and the second unit application sleeve 24 may vary as desired in different embodiments. The first unit application sleeve 14 and the second unit application sleeve 24 absorb primer delivered from the application receptacle 13 of the first application unit 1 and the annular distributing container 21 of the second application unit 2, respectively, and the absorbed primer is transferred laterally through the first unit application sleeve 14 and the second unit application sleeve 24 in order to evenly distribute primer onto the exterior lateral surface 4 and the interior lateral surface 5, respectively, of a pipe 3 or corresponding fittings.

Figure 9:
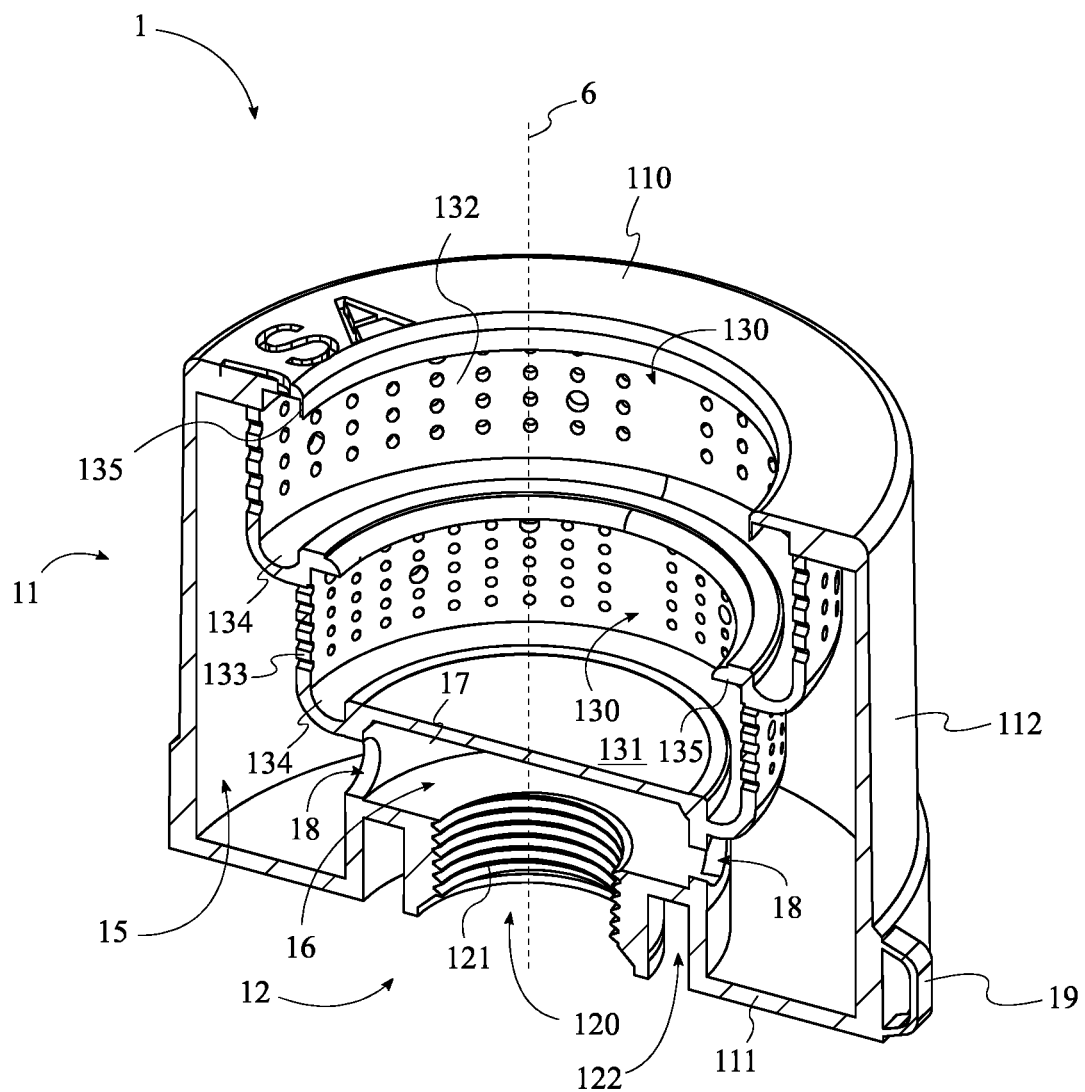
FIG. 9 is a raised perspective cross-sectional view of the first application unit.

Returning to the first application unit 1, referring to FIG. 9, the first unit housing 11 comprises a top 110, a bottom 111, and an outer shell 112. The outer shell 112 is perimetrically connected between the top 110 and the bottom 111 and is preferably a hollow cylindrical wall. The application receptacle 13 is integrated into the top 110, and the supply engagement feature 12 of the first application unit 1 is integrated into the bottom 111 of the first unit housing 11.

Moreover, in the preferred embodiment the supply engagement feature 12 of the first application unit 1 comprises a supply opening 120, an internal threading 121, and an annular recess 122. The internal threading 121 is integrated into the bottom 111, and the supply opening 120 traverses through the internal threading 121. Further, the annular recess 122 traverses into the bottom 111, around the internal threading 121. The internal threading 121 and the annular recess 122 are adapted to mate with a typical pre-existing container of primer or similar material. It should be noted that the specified arrangement of the internal threading 121 and annular recess 122 are not to be considered limiting to all embodiments of the present invention, and other arrangements may be comprised in different embodiments in order to adequately engage with any other configuration of material supply container or supply system.

In the preferred embodiment of the present invention, the first application unit 1 further comprises a reservoir cavity 15. The reservoir cavity 15 is positioned within the first unit housing 11, such that the supply engagement feature 12 is disposed in fluid communication with the application receptacle 13 through the reservoir cavity 15. More particularly, the reservoir cavity 15 is concentrically positioned around the application receptacle 13 within the first unit housing 11, such that primer contained within the reservoir cavity 15 is free to flow through the perforations of the at least one perforated annular wall 130.

Moreover, in some embodiments, the first application unit 1 further comprises a supply cavity 16 in addition to the reservoir cavity 15. The supply cavity 16 is positioned between the supply engagement feature 12 and the solid base 131, and the supply cavity 16 is disposed in fluid communication with the reservoir cavity 15. The supply cavity 16 is positioned directly adjacent to the supply engagement feature 12, while the reservoir cavity 15 is positioned concentrically around the supply engagement feature 12 and the application receptacle 13. A supply lateral wall 17 concentrically delineates the supply cavity 16, wherein the supply lateral wall 17 is concentrically positioned around the supply engagement feature 12 within the first unit housing 11 and is axially connected between the bottom 111 of the first application unit 1 and the solid base 131 of the application receptacle 13. One or more supply apertures 18 traverse laterally through the supply lateral wall 17 from the supply cavity 16 into the reservoir cavity 15. Thus, primer received through the supply engagement feature 12 may flow into the supply cavity 16, through the supply apertures 18, into the reservoir cavity 15, and through the at least one perforated annular wall 130, where it is absorbed by the first unit application sleeve 14 and transferred thereby to the exterior lateral surface 4 of a pipe 3 positioned within the application receptacle 13 and laterally abutted against the first unit application sleeve 14.

Referring to FIG. 4, in the preferred embodiment, the present invention may further comprise a plugging means in order to occlude the supply engagement feature 12 while a primer supply canister is not connected to the supply engagement feature 12. In some embodiments, the plugging means may comprise a dual-threaded nut 8 and a solid body threaded plug bolt 9. The dual-threaded nut 8 comprises a set of internal threads 80 and a set of external threads 81. In order to receive the dual-threaded nut 8, the supply engagement feature 12 is provided with an internal threading 121. In order to plug the supply engagement feature 12, during assembly, the dual-threaded nut 8 is positioned into the supply opening 120 by a threading operation that engages the external threads 81 of the dual-threaded nut 8 concentrically within the internal threading 121 of the supply engagement feature 12. Moreover, the supply opening 120 may be sealed at the bottom 111 of the first unit housing 11 by threading the solid body threaded plug bolt 9 into the set of internal threads 80 of the dual-threaded nut 8, producing a seal-type threading engagement between the external threads of the solid body threaded plug bolt 9 and the set of internal threads 80 of the dual-threaded nut 8. In this manner, the supply opening 120 is closed so that primer material already supplied to the first application unit 1 and located within the reservoir cavity 15 and/or the supply cavity 16 is constrained within the first unit housing 11. Preferably, the plug bolt 9 may be fastened and unfastened using an Allen wrench head tool or another suitable fastener tool head type. However, this is only one potential arrangement for the plugging means, and any other configuration may be utilized in different embodiments as desired to occlude the supply engagement feature 12, such as, but not limited to, a singular, internally solid, externally threaded plug nut.

Furthermore, in some embodiments, the application receptacle 13 of the first application unit 1 may be adapted for the ability to receive and apply primer to multiple sizes of pipe 3 with the same individual unit. To this end, the at least one perforated annular wall 130 may comprise multiple perforated annular walls 130. In such embodiments having multiple perforated annular walls 130 of the application receptacle 13, each perforated annular wall 130 must be different in diameter, and the perforated annular walls 130 must be connected axially adjacent to each other in series, progressing from the smallest diameter at the solid base 131 to the largest diameter adjacent to the top 110 of the first unit housing 11, generally forming a stepped cone shape.

More particularly, in some embodiments, as shown in FIG. 9, the at least one perforated annular wall 130 of the application receptacle 13 comprises a first perforated annular wall 132 and a second perforated annular wall 133, though it should be noted that the quantity of perforated annular walls 130 should not be limited to two. The first perforated annular wall 132 has a larger diameter than the second perforated annular wall 133 and is perimetrically connected to the top 110 of the first unit housing 11. The second perforated annular wall 133 is perimetrically and axially connected between the first annular wall and the solid base 131 of the application receptacle 13. The first perforated annular wall 132 and the second perforated annular wall 133 may be embodied with any desired diameters, though in various embodiments, the diameters of the first perforated annular wall 132 and the second perforated annular wall 133 should be selected in order to receive and apply primer to pipes with common diameters of PVC pipes. For example, in some embodiments, the first perforated annular wall 132 may have a diameter of one inch, while the second perforated annular wall 133 may have a diameter of two inches. In various embodiments, the diameters of the first perforated annular wall 132 and the second perforated annular wall 133, or any member of the at least one perforated annular wall 130 may be selected in order to accommodate any size pipe 3 or pipe fitting 40 as desired.

Further, in some embodiments of the present invention, each of the at least one perforated annular wall 130 may comprise a trough 134 and an overhang 135. The trough 134 and the overhang 135 are perimetrically connected and terminally positioned opposite each other along the perforated annular wall 130, such that each perforated annular wall 130 extends axially between the trough 134 and the overhang 135. The trough 134 and the overhang 135 each extend radially inward toward the central axis 6 of the first application unit 1. The first unit application sleeve 14 is removably positioned laterally adjacent to the annular wall between the trough 134 and the overhang 135, such that the first unit application sleeve 14 is held in place against the perforated annular wall 130 by the trough 134 and the overhang 135.

Further, in the preferred embodiment, the first application unit 1 comprises at least one clip attachment 19. The at least one clip attachment 19 is externally connected to the first unit housing 11, preferably adjacent to the bottom 111, though the position of the at least one clip attachment 19 may vary on the first unit housing 11. The at least one clip attachment 19 may further vary in geometry in different embodiments, but should generally form a closed loop in order to enable a user to attach a clip to the at least one clip attachment 19 in order to store or carry the first application unit 1.

As previously described, the second application unit 2 of the present invention is configured as a counterpart to the first application unit 1, wherein the first application unit 1 is adapted to apply primer to the exterior lateral surface 4 of a pipe 3, whereas the second application unit 2 is adapted to apply primer to the interior lateral surface 5 of a pipe 3. When a first pipe portion and a second pipe portion (or a pipe 3 and a joint or connector piece) are joined together, by necessity, the outer diameter of a first pipe portion must be sized to produce a friction fit with the inner diameter of a second pipe portion, wherein primer is applied to the exterior lateral surface 4 of the first pipe portion and to the interior lateral surface 5 of the second pipe portion. Therefore, it is desirable in various instances to configure the first application unit 1 to apply primer (or adhesive, or another substance) to the exterior lateral surface 4 of a pipe 3 with a specified outer diameter, and the second application unit 2 to apply primer to the interior lateral surface 5 of a pipe 3 with a specified inner diameter, wherein the specified outer diameter and the specified inner diameter are roughly equal. However, this is not necessarily considered to be a strict requirement in all embodiments of the present invention.

In the preferred embodiment, the second application unit 2 further comprises a base 25 and an outer lateral wall 26, as shown in FIG. 10. The outer lateral wall 26 is perimetrically connected to the base 25, and the outer later wall of the second application unit 2 preferably has a slightly larger diameter than the outer shell 112 of the first unit housing 11 of the first application unit 1, such that the outer lateral wall 26 of the second application unit 2 is configured to sleeve the outer shell 112 of the first application unit 1.

Moreover, as previously mentioned, the second application unit 2 further comprises a supply opening 27. In the preferred embodiment, the supply receptacle 20 is concentrically and terminally connected to the base 25, while the supply opening 27 traverses through the base 25 into the supply receptacle 20. Further, the annular distributing container 21 is concentrically connected to the base 25 around the supply receptacle 20. Further, in addition to the supply opening 27, the second application unit 2 may additionally comprise an internal threading and an annular recess configured in a similar fashion as the supply engagement feature 12 of the first application unit 1 in order to engage with a pre-existing primer supply canister. Alternatively, the second application unit 2 may additionally comprise an external threading configured to receive a dauber cap 7, as shown in FIGS. 2, 7, and 10.

As previously discussed, the supply receptacle 20 may be understood herein as a hollow cylindrical member that serves a similar function as the supply cavity 16 of the first application unit 1; that is, to receive primer and distribute the primer through various fluid passageways in the form of the at least one spout set 22.

Generally, in the preferred embodiment, referring to FIG. 10, the at least one spout set 22 comprises a first spout set 220, a second spout set 221, and a third spout set 222. The first spout set 220 traverses between the supply receptacle 20 and the annular distributing container 21. The second spout set 221 traverses through the annular distributing container 21, and the third spout set 222 traverses through the supply receptacle 20.

The annular distributing container 21 is the component of the second application unit 2 that inversely corresponds to the application receptacle 13 of the first application unit 1, in that the annular distributing container 21 is the physical structure of the second application unit 2 responsible for distributing primer material onto the interior lateral surface 5 of a pipe 3, through the second unit application sleeve 24 as previously mentioned. The annular distributing container 21 comprises at least one distributing lateral wall 210, and each of the at least one distributing lateral wall 210 is connected to the base 25 of the second application unit 2 around the supply receptacle 20.

More particularly, the annular distributing container 21 comprises a distributing lateral wall 210, an annular connecting member 211, and an annular cavity 212. The distributing lateral wall 210 is connected to the base 25 of the second application unit 2 around the supply receptacle 20. The annular connecting member 211 is connected between the distributing lateral wall 210 and the supply receptacle 20 opposite the base 25 of the second application unit 2 along the distributing lateral wall 210. This results in the formation of the annular cavity 212, which is annularly positioned between the supply receptacle 20 and the distributing lateral wall 210.

In the preferred embodiment, the first spout set 220 from the at least one spout set 22 traverses through the supply receptacle 20 into the annular cavity 212. In some embodiments, each of the first spout set 220 may simply be a through hole laterally traversing through the supply receptacle 20. The second spout set 221 from the at least one spout set 22 traverses through the distributing lateral wall 210 into the annular cavity 212. In some embodiments, each of the second spout set 221 may also be a simple through hole similar to the first spout set 220. The third spout set 222 traverses through the supply receptacle 20, from adjacent to the base 25, through the annular connecting member 211. The third spout set 222 is differentiated from the first spout set 220 and the second spout set 221 in that each of the third spout set 222 is oriented parallel to the central axis 6 of the second application unit 2, instead of laterally, or perpendicular to the central axis 6. Moreover, in some embodiments, the first spout set 220 intersects with the third spout set 222.

In the previously described configuration, the annular distributing container 21 has a larger diameter than the supply receptacle 20. Moreover, in some embodiments, the closed end 210 of the supply receptacle 20 extends axially away from the base 25 beyond the annular distributing container 21, such that the connecting member 211 is positioned axially between the closed end 210 and the open end 200 of the supply receptacle. This forms a two-tiered primer distributing member as an inverse counterpart to the two-tiered perforated annular wall of the first application unit 1. It should again be noted that such a two-tiered configuration as described herein is presented as one exemplary, preferred embodiment and should not be considered to be limiting to the present invention as a whole, wherein the present invention may be embodied with a singular tier, or more than two tiers, as desired in various embodiments.

The second unit application sleeve 24 may be removably positioned around the annular distributing container 21, or around the portion of the supply receptacle 20 which extends axially beyond the annular distributing container 21, as the inner diameter of the interior lateral surface 5 of the pipe 3 to be primed dictates. In some embodiments, a pair of second unit application sleeves 24 may be comprised, one positioned around the annular distributing container 21, and one positioned around the upper end of the supply receptacle 20.

Thus, primer is received through the supply opening 27 of the second application unit 2 into the supply receptacle 20. From there, the primer is free to flow through the first spout set 220 into the annular cavity 212 between the supply receptacle 20 and the distributing lateral wall 210, and subsequently through the third spout set 222 in order to soak the second unit application sleeve 24 positioned around the at least one distributing wall. Further, primer is also free to flow from the first spout set 220 and through the second spout set 221 in order to emerge adjacent to the second unit application sleeve 24 positioned around the closed end 210 of the supply receptacle 20. Thus, in the preferred embodiment, the second application unit 2 is enabled to apply primer to the interior lateral surfaces 5 of pipes of two different inner diameters corresponding to the outer diameters of the closed end 210 of the supply receptacle 20 and the at least one distributing lateral wall 210. In other embodiments, the at least one distributing lateral wall 210 may comprise a plurality of distributing lateral walls 210, which may be arranged along with the spout sets 22 in a similar fashion to enable a plurality of diameters of internal lateral wall application surfaces.

Finally, as an ancillary feature, the present invention may further comprise at least one deburring tool. The deburring tool may be generally understood to comprise at least one blade or sharp edge, which the user may utilize to shave burrs or other irregularities from the terminal edge of a pipe 3. The deburring tool may be connected externally or internally to either the first application unit 1 or the second application unit 2 as desired, and may be positioned in any suitable location. Further, the deburring tool may utilize any currently known or new configuration of components to achieve the known functionality of a deburring tool. In some embodiments, the deburring tool is annular and connected concentrically around the first application unit 1 or the second application unit 2. In some embodiments, the deburring tool may take the form of a singular projection from the exterior of the first application unit 1 or the second application unit 2, as desired in various embodiments.

The following is a supplemental, exemplary disclosure of the present invention discussing an alternative embodiment. The following disclosure is presented in order to more fully demonstrate the spirit of the present invention and should not be considered to be limiting. Some component nomenclature may overlap between the preceding and the following disclosure, however the sets of disclosed components between the preceding disclosure and the following disclosure should generally be considered distinct from each other.

The present invention is directed to a priming tool that applies a layer of primer to the exterior and interior surfaces of a PVC pipe before an adhesive layer is applied. The priming tool includes a pair of individual tool units each configured with a body in the form of an open-ended cylindrical container adapted to receive a PVC pipe section mounted therein during use. The first, an internal priming tool unit, includes a hollow male cylindrical member for insertion into the pipe during use. A set of holes is formed in the sidewall of the male cylindrical member. An absorbent, sleeve-shaped applicator is annularly disposed about the male cylindrical member.

The bottom end of the container is adapted to engage the neck portion of a pre-existing primer canister, which supplies primer material into a chamber space defined in the hollow interior of the male cylindrical member. This primer material accesses the chamber space and flows radially outward through the set of cylinder wall holes and wets the surrounding applicator, which then applies the primer material to the inner surface of the pipe as the pipe slides axially over the applicator. The second, an external priming tool unit, includes a hollow female cylindrical member for receiving the pipe during use. A set of holes is formed in the sidewall of the female cylindrical member. An absorbent, sleeve-shaped applicator is concentrically located inside the female cylindrical member. The bottom end of the container is adapted to engage the neck portion of the pre-existing primer canister, which supplies primer material into a chamber space defined annularly about the female cylindrical member. This primer material accesses the chamber space and flows radially inward through the set of cylinder wall holes and wets the applicator nested inside, which then applies the primer material to the outer surface of the pipe as the pipe slides axially through the applicator. The diameters of the male cylindrical member and the female cylindrical member in the pair of tool units are different, enabling the pair of tool units to be mated together in a telescoping relationship to facilitate their storage and packaging as a single assembled combination.

Introducing a first embodiment of the invention, the present invention consists of a priming tool. The priming tool comprises:
a first unit and a second unit;
the first unit including:
a container having a bottom and an open top,
a hollow male cylindrical member defined in the first unit container and extending from an open lower end and terminating at a closed upper end,
a chamber space defined at an interior of the male cylindrical member,
a plurality of apertures formed in a circumferential periphery of the male cylindrical member,
an opening formed in the container bottom and disposed in fluid communication with the chamber space,
an exterior circular recess formed in the container bottom and encircling the opening, and
an outer applicator sleeve selectively removably located over the male cylindrical member and made at least in part of an absorbent material;
the second unit including:
a container having a bottom and an open top,
a hollow female cylindrical member defined in the second unit container and extending from a closed lower end and terminating at an open upper end,
a chamber space disposed annularly about the female cylindrical member,
a plurality of apertures formed in a circumferential periphery of the female cylindrical member,
an opening formed in the container bottom and disposed in fluid communication with the chamber space,
an exterior circular recess formed in the container bottom and encircling the opening, and
an inner applicator sleeve selectively removably located within the female cylindrical member and made at least in part of an absorbent material.

In a second aspect, a diameter of the first unit male cylindrical member may be smaller than a diameter of the second unit female cylindrical member, such that the first unit and the second unit can be assembled together in a telescoping configuration wherein the first unit male cylindrical member is nested inside the second unit female cylindrical member.

In another aspect, a diameter of the first unit container may be larger than a diameter of the second unit container.

In yet another aspect, during deployment of the priming tool, a tubular pipe section may be installed in the first unit by locating the pipe section over the outer applicator sleeve, such that an interior surface of the pipe section is disposed in facing opposition with an outer surface of the outer applicator sleeve.

In yet another aspect, during deployment of the priming tool, a tubular pipe section may be installed in the second unit by locating the pipe section inside the inner applicator sleeve, such that an exterior surface of the pipe section is disposed in facing opposition with an inner surface of the inner applicator sleeve.

These and other objects, features, and advantages of the present invention will become more readily apparent from the attached drawings and the detailed description of the preferred embodiments, which follow.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 11. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a priming tool that applies a layer of primer to the exterior and interior surfaces of a PVC pipe before an adhesive layer is applied. It should be readily understood, however, that the present invention may be alternatively directed to an substance application tool that applies any substance, such as a cleaner or adhesive, and or any other substance, to the exterior and interior surfaces of a PVC pipe. Turning to a preferred embodiment, the priming tool is deployed in the form of a pair of individual tool units (FIG. 12) each configured with a body in the form of an open-ended cylindrical container adapted to receive a PVC pipe section mounted therein during use. The first, an internal priming tool unit, is configured with a hollow male cylindrical member for insertion into the pipe during use (i.e., the pipe section slides over the male cylindrical member in a telescoping or concentric arrangement), in order to facilitate priming of the interior surface of the pipe via a sleeve-shaped applicator annularly disposed about the male cylindrical member (FIGS. 14-20). The second, an external priming tool unit, is configured with a hollow female cylindrical member for receiving the pipe during use (i.e., the pipe section slides into the female cylindrical member in a telescoping or concentric arrangement), in order to facilitate priming of the exterior surface of the pipe via a sleeve-shaped applicator nested inside the female cylindrical member (FIGS. 21-25). The bottom end of each tool unit is adapted to engage the neck portion of a pre-existing primer canister (or adhesive canister) to receive primer/adhesive material, which is then supplied to the respective applicator of each tool unit. The diameters of the male cylindrical member and the female cylindrical member in the pair of tool units are different, enabling the pair of tool units to be mated together in a telescoping relationship to facilitate their storage and packaging as a single assembled combination (FIGS. 11 and 13).

Figure 11:
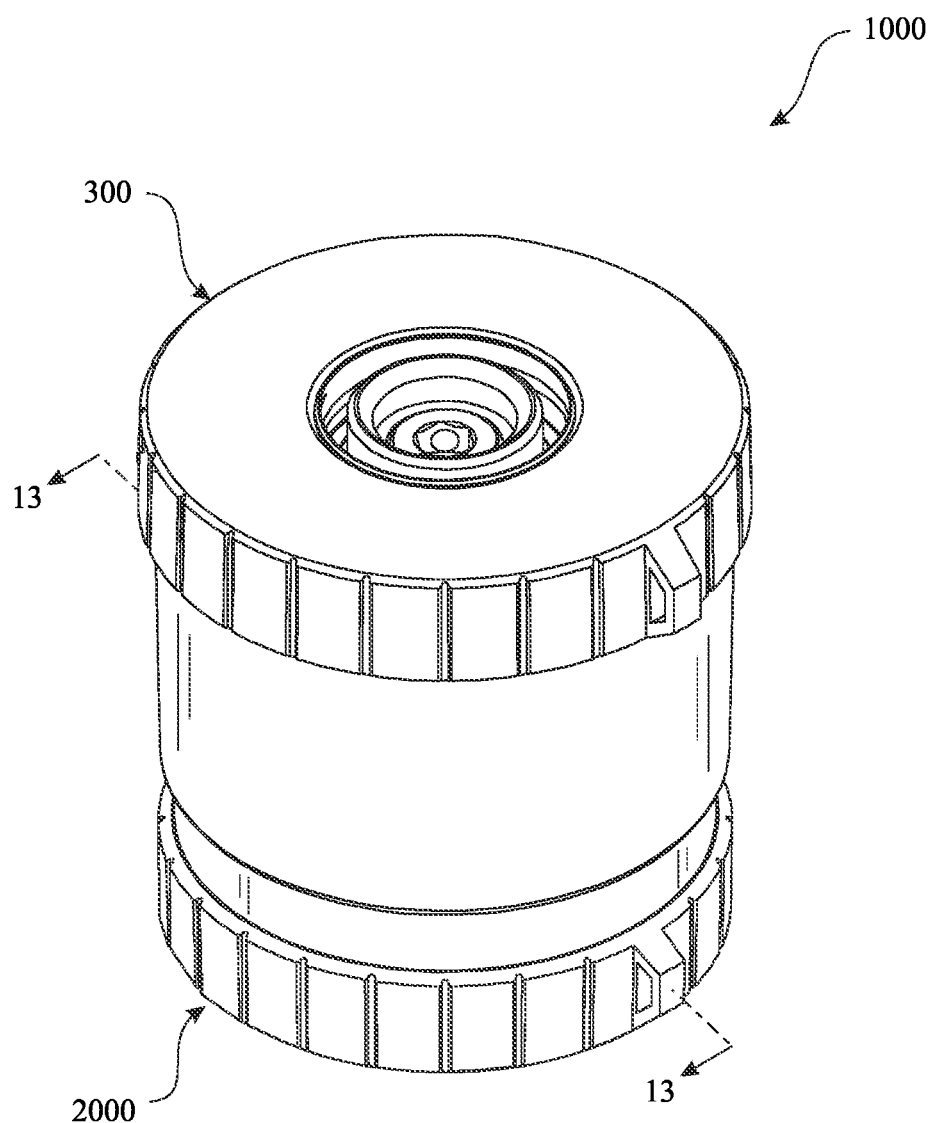
FIG. 11 is a raised perspective view showing an alternative embodiment of the priming tool of the present invention in its assembled configuration.
Figure 12:
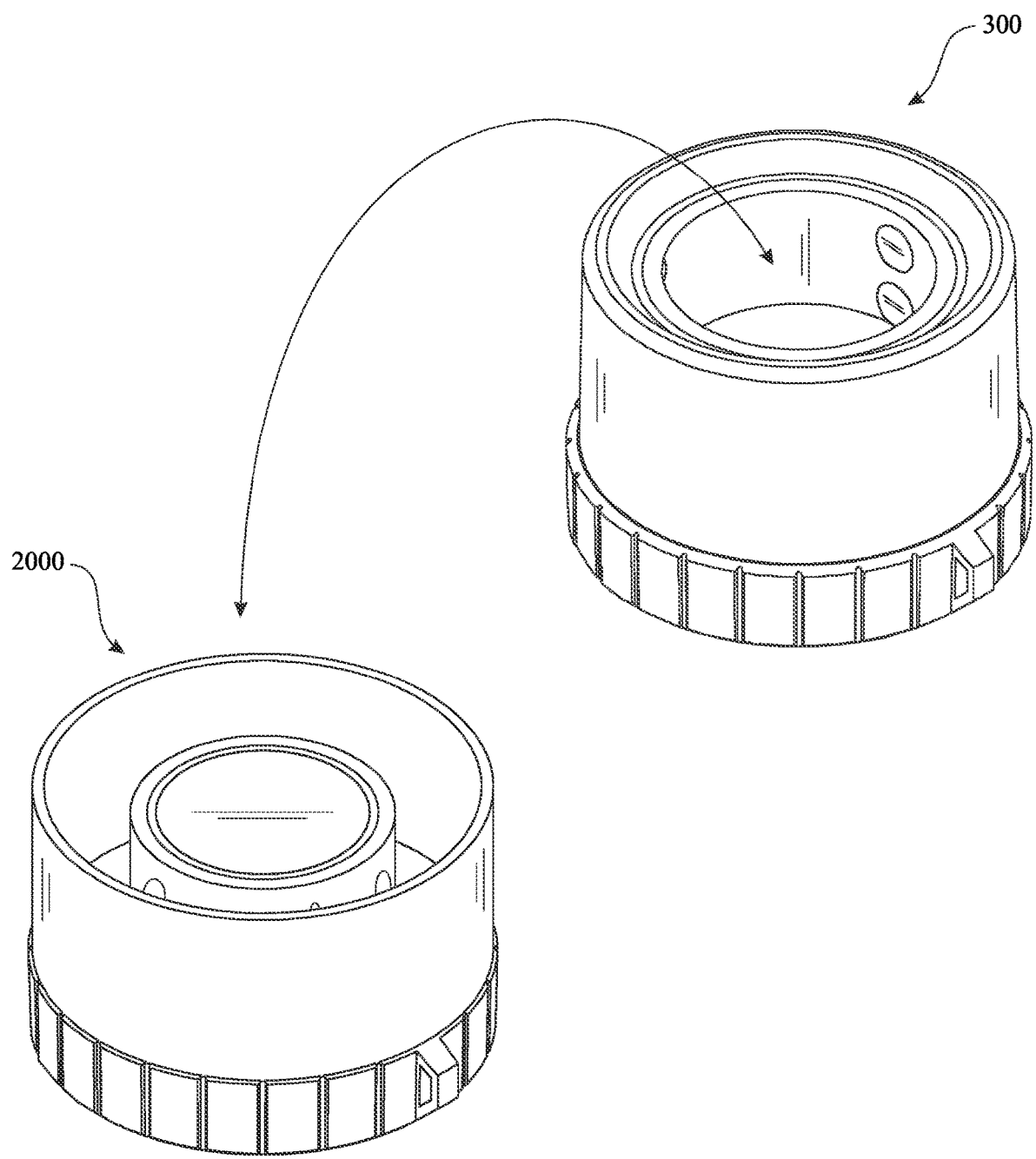
FIG. 12 is an exploded perspective view of the alternative embodiment.
Figure 13:
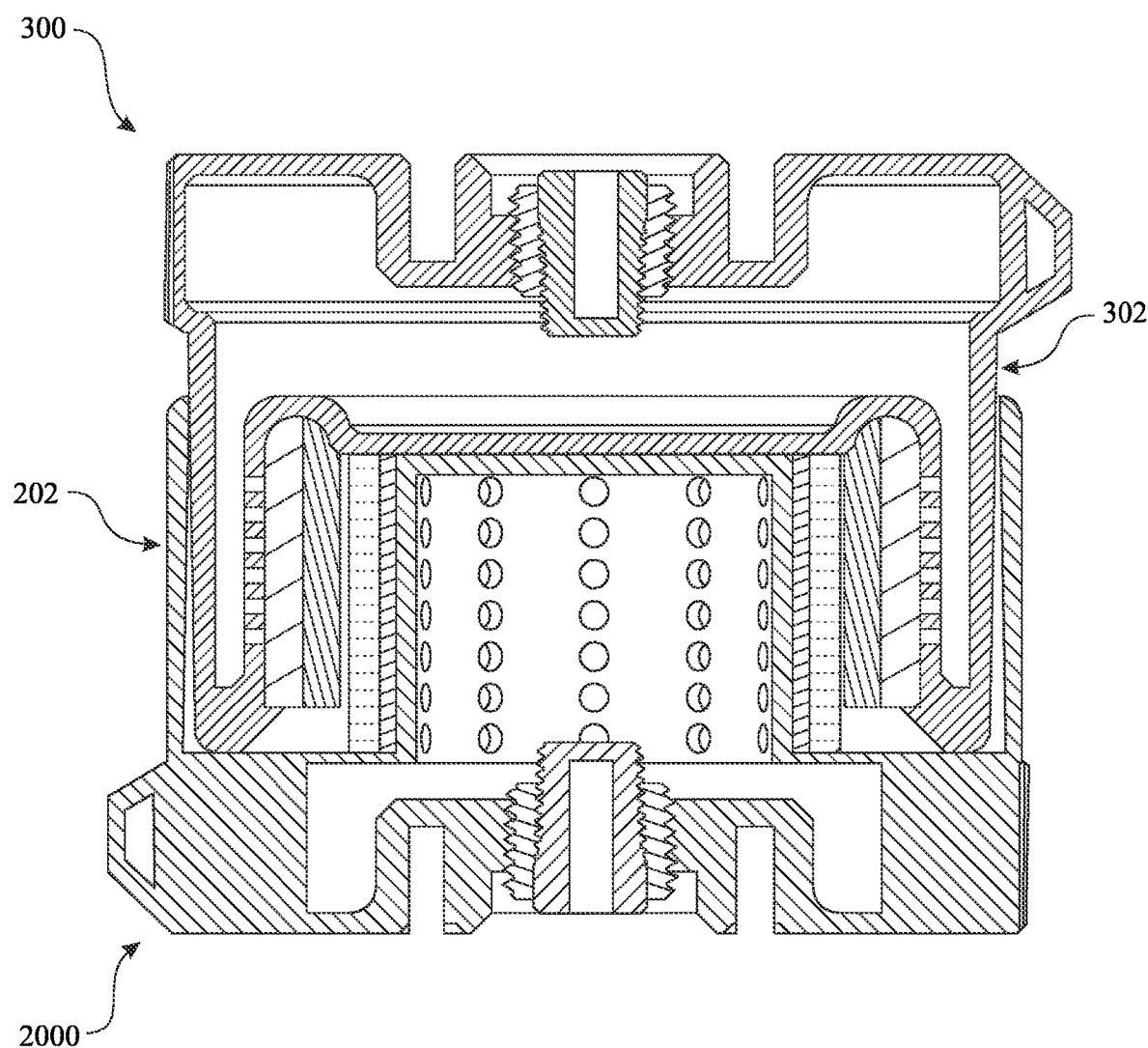
FIG. 13 is a cross-sectional view of the alternative embodiment taken along line 13-13 of FIG. 11.

Referring initially to FIGS. 11-13, a first exemplary embodiment of a priming tool combination 1000 that includes a first internal priming tool unit 2000 and a second external priming tool unit 300 is described. As discussed further, the first tool unit 2000 and second tool unit 300 are configured so that the pair of units 2000, 300 can be interfit or joined with one another to form a single compact assembly (FIG. 10), which facilitates the storage, packaging, and transport of priming tool 1000. Moreover, as discussed further, the first tool unit 2000 is configured to facilitate the application of primer material to the interior surface 402 of an exemplary pipe section 400 (FIG. 17), while the second tool unit 300 is configured to facilitate the application of primer material to the exterior surface 404 of pipe section 400 (FIG. 23), during deployment of the pair of tool units 2000, 300. The tool units 2000, 300 are adapted for connection to a primer supply source 500 (FIGS. 16 and 21), which facilitates the transfer of primer material from source 500 to each of the tool units 2000, 300.

Referring now to FIGS. 14-20, the first internal priming tool unit 2000 includes, in combination, a container 202, a cylindrical male member 204, and a selectively removable, sleeve-shaped applicator 206. In the assembled arrangement, as discussed further, sleeve-shaped applicator 206 is annularly disposed about the cylindrical male member 204 in a concentric, nesting configuration. During deployment of tool unit 2000, a pipe section 400 is concentrically located over applicator 206. In one exemplary embodiment, the shaped applicator 206 may be made out of felt.

Figure 18:
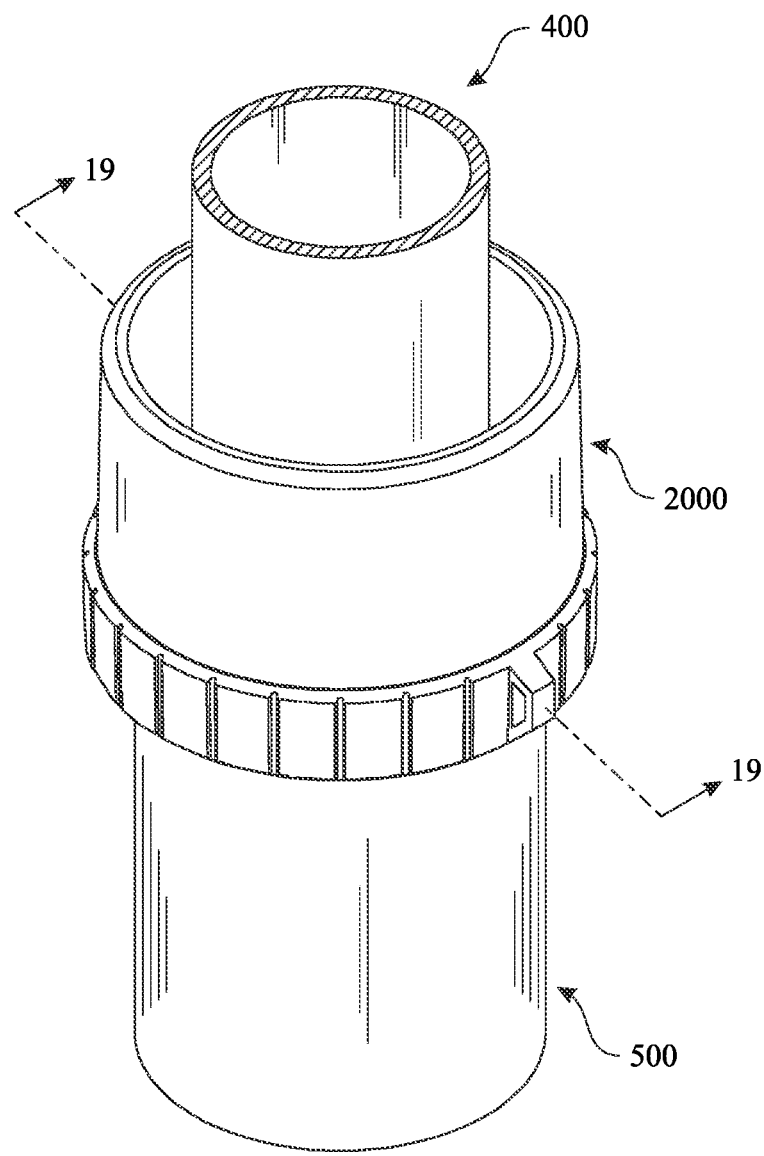
FIG. 18 is a raised perspective view of the alternative embodiment showing the pipe section of FIG. 17 installed in the internal priming unit during use.

The container 202 includes a body 205, a bottom 207, and an open top 214. In a preferred form, the body 205 of container 202 has a cylindrical shape. The cylindrical male member 204 extends axially from an open lower end 225 at container bottom 207 and terminates at a closed upper end 227, providing an exemplary cross-sectional profile of an inverted U-shape. The male member 204 is centrally located within container 202 and preferably forms an integral, one-piece construction with container 202. In use, the male member 204 serves as a mounting post or structure to receive pipe section 400 (FIG. 18). The male member 204 defines a hollow interior space or chamber 230, open at its lower end 225 and closed at its upper end 227. The sleeve-shaped applicator 206 is a separate removable piece that can be selectively located over male member 204. In this assembled configuration, sleeve-shaped applicator 206 slides onto male member 204 in a nested, concentric relationship and becomes annularly disposed about male member 204.

Figure 14:
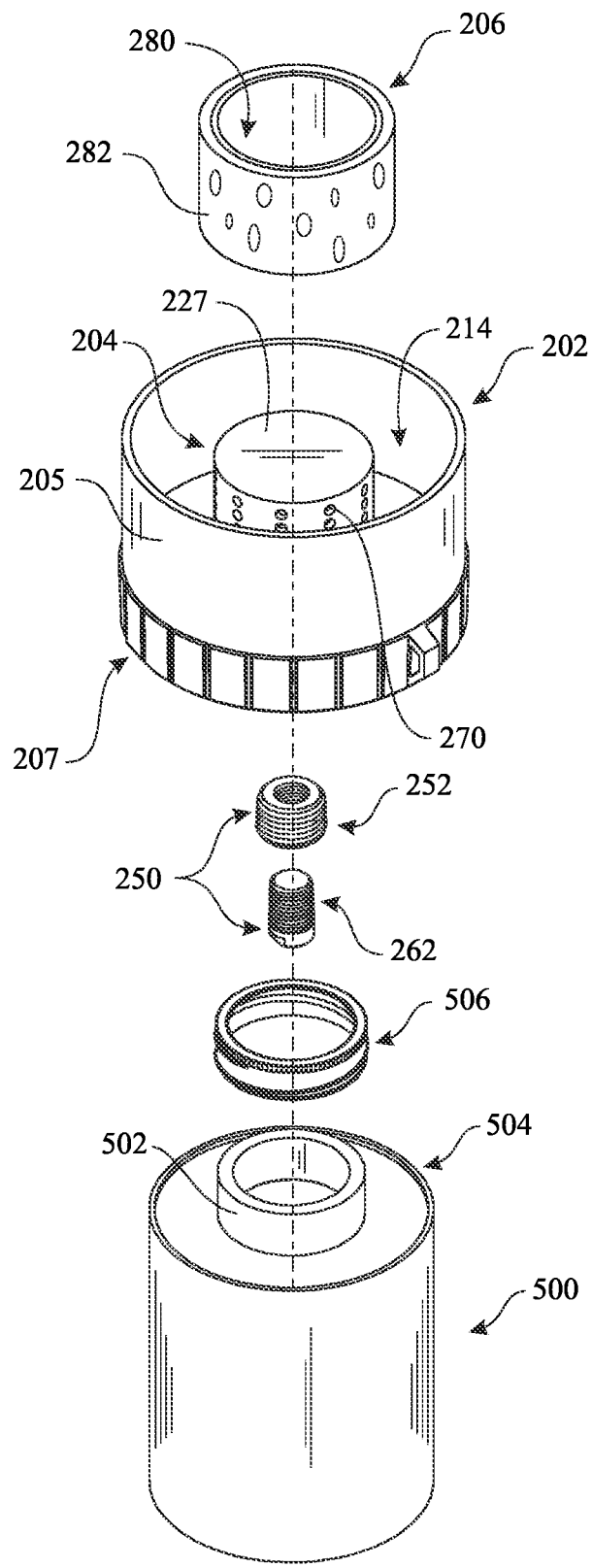
FIG. 14 is an exploded raised perspective view of the alternative embodiment showing the internal priming unit in juxtaposition with a conventional primer supply source.
Figure 15:
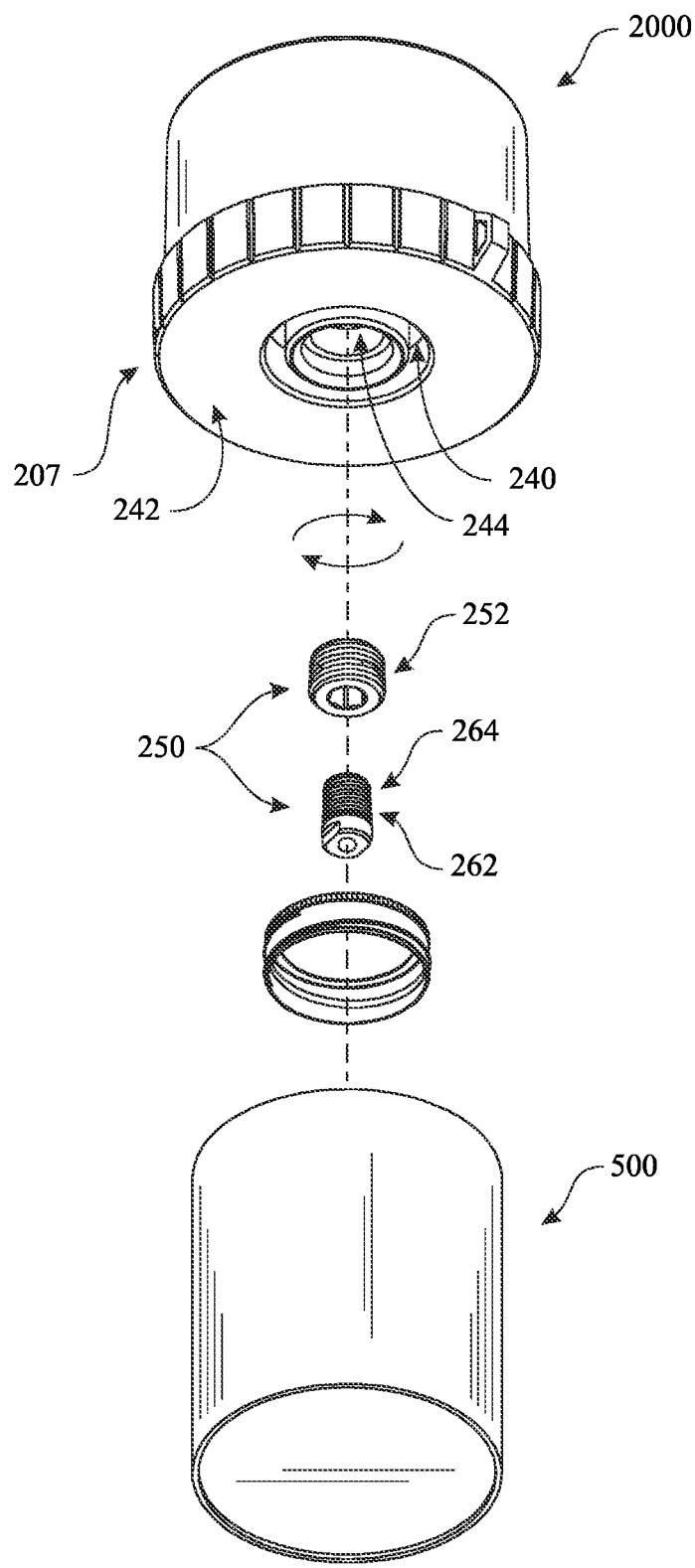
FIG. 15 is an exploded lowered perspective view of the alternative embodiment showing a plugging means of the internal priming unit in juxtaposition with a conventional primer supply source.

The bottom 207 of container 202 is adapted to support various functionalities. First, to provide an interface to permit the primer supply canister 500 to mate with container 202 at bottom 207, in order to facilitate the transfer of primer material from canister 500 into container 202. Second, to provide a fluid path to enable primer material supplied from canister 500 to communicate to the interior chamber 230 of the cylindrical male member 204. Referring briefly to FIG. 14, the primer supply canister 500 has a conventional construction and includes a circular neck 502 at an upper discharge end 504 of canister 500 and a ring-like cover 506 fit about neck 502. The canister 500 contains primer material that is supplied via the outlet defined by neck 502.

Figure 19:
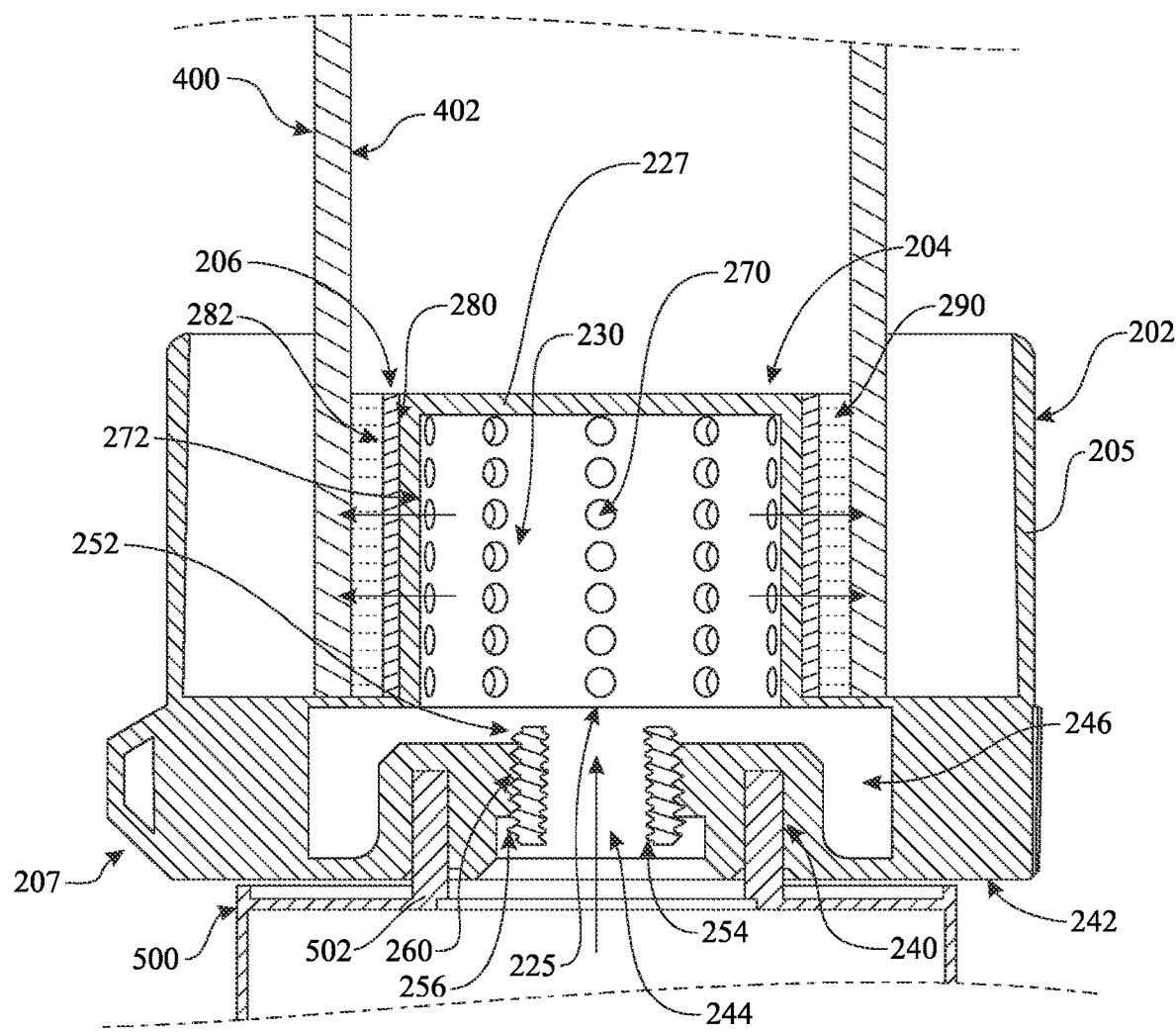
FIG. 19 is a cross-sectional view of the alternative embodiment taken along line 19-19 of FIG. 18.

In order to accommodate the mating of container 202 with primer supply canister 500, the bottom 207 of container 202 includes an axially-extending circular recess, indent, slot, or groove 240 (FIGS. 15 and 19) formed in the lower side 242 of bottom 207. The circular recess 240 formed at the underside of container 202 is suitably sized and shaped to receive neck 502 of primer supply canister 500 (FIG. 19). The bottom 207 of container 202 is further configured with a central opening 244 formed at the lower side 242 of bottom 207. The central opening 244 is bounded or encircled by circular recess 240 formed in container bottom 207, so that contents discharged from primer supply canister 500 via the outlet formed by neck 502 (when canister 500 is mated to container 202) will flow into container 202 via opening 244.

The container bottom 207 is also configured with a hollowed-out portion 246 defining a cavity void or chamber space that is disposed in fluid communication with both central opening 244 and the interior chamber space 230 of male member 204 (via the open lower end 225 of cylindrical male member 204). One feature of cavity void 246 is that it serves as a transition space between central opening 244 and the interior chamber space 230 of male member 204. In this manner, primer material discharged from canister 500 can access and fill the interior space 230 of the cylindrical male member 204 by communicating through opening 244 and cavity 246.

As discussed further, the operating configuration between the first internal priming tool unit 2000 and the primer supply canister 500 can take different forms. In one operating mode, the canister 500 can remain connected to the first tool unit 2000 throughout the priming operation (FIGS. 16-19), which can be advantageous to allow the tool unit 2000 to be replenished with primer material as it is applied to pipe section 400 and becomes exhausted from the interior space 230 of male member 204. Alternately, in another operating mode, the primer supply canister 500 is disconnected after it supplies primer material to first tool 2000 and remains so during the application of primer material to pipe section 400 via first tool 2000. For this purpose, the first internal priming tool unit 2000 includes a means 250 for plugging the opening 244 formed in container bottom 207. The plugging means 250 includes a dual-threaded nut 252 having a set of internal threads 254 and a set of external threads 256. In order to receive nut 252, the peripheral surface of opening 244 formed in container bottom 207 is provided with a threaded area 260. During assembly, nut 252 is located in opening 244 by a threading operation that engages the external threads 256 of nut 252 with the threads 260 defined in container bottom 207 at opening 244. The plugging means 250 further includes a solid body threaded plug bolt 262 having external threads 264. The first internal priming tool unit 2000 can be sealed at container bottom 207 by threading plug 262 into nut 252, producing a seal-type threading engagement between the external threads 264 of plug 262 and the internal threads 254 of nut 252. In this manner, opening 244 is closed, so that primer material already supplied to tool unit 2000 and located in cavity void 207 is held in container 202. The plug bolt 262 can be fastened and unfastened using an Allen wrench head.

The bottom 207 of container 202 can be configured in any suitable manner to form cavity void 246. As shown, in one form, cavity void 246 has an L-shaped cross-sectional profile extending in the radial direction from the longitudinal axis of container 202. As the transition space between opening 244 and the open lower end 225 of cylindrical male member 204, the cavity 246 can also function as an antechamber for holding primer material prior to its application, particularly when the primer supply canister 500 is disconnected from tool unit 2000 after supplying it with primer material. Primer material supplied to tool unit 2000 preferably fills both the interior space 230 of cylindrical male member 204 and cavity 246. In this way, after supply canister 500 is disconnected and the tool unit 2000 is plugged, the primer material held in cavity 246 can replenish interior space 230 of male member 204 as primer material is withdrawn from there by its application to pipe section 400.

The cylindrical male member 204 of tool unit 2000 is provided with a set of apertures 270 formed in and through the circumferential, peripheral sidewall 272 of male member 204 (FIGS. 14 and 19). The apertures 270 are distributed throughout the sidewall 272. The sleeve shaped applicator 206 is located over the cylindrical male member 204 in a concentric, nesting relationship so that applicator 206 is disposed annularly about male member 204. In this nesting configuration between male member 204 and sleeve-shaped applicator 206, an inner surface of applicator 206 faces the set of apertures 270 formed in sidewall 272 of male member 204. The interior chamber space 230 of male member 204 is disposed in communication with the annularly surrounding applicator 206 via the set of apertures 270 formed in peripheral sidewall 272 of male member 204. In this manner, primer material located in chamber space 230 can access applicator 206 by communicating through apertures 270. The applicator 206 is preferably made of a suitable absorbent material that permits a transfer or exchange of primer material from its inner surface 280 (adjacent cylindrical male member 204) to its outer surface 282 (adjacent the interior surface 402 of pipe section 400 during use).

Figure 16:
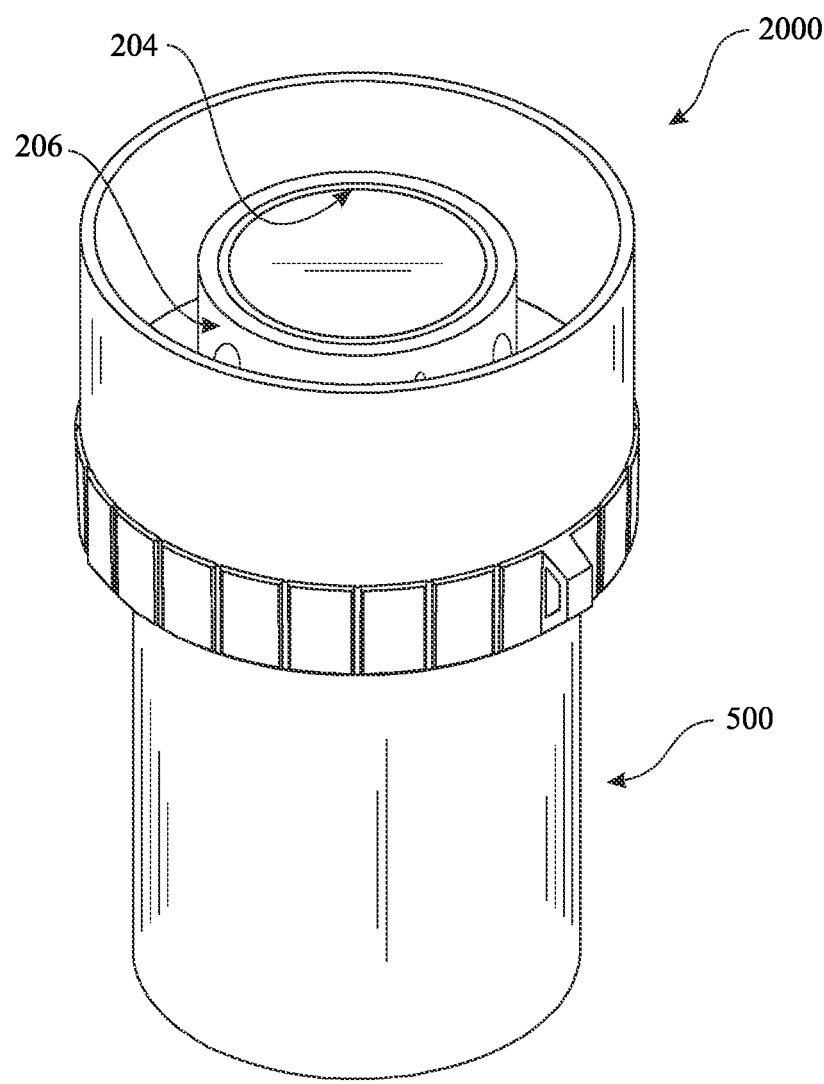
FIG. 16 is a raised perspective view of the alternative embodiment showing the internal priming unit being removably attached to a primer supply source.
Figure 17:
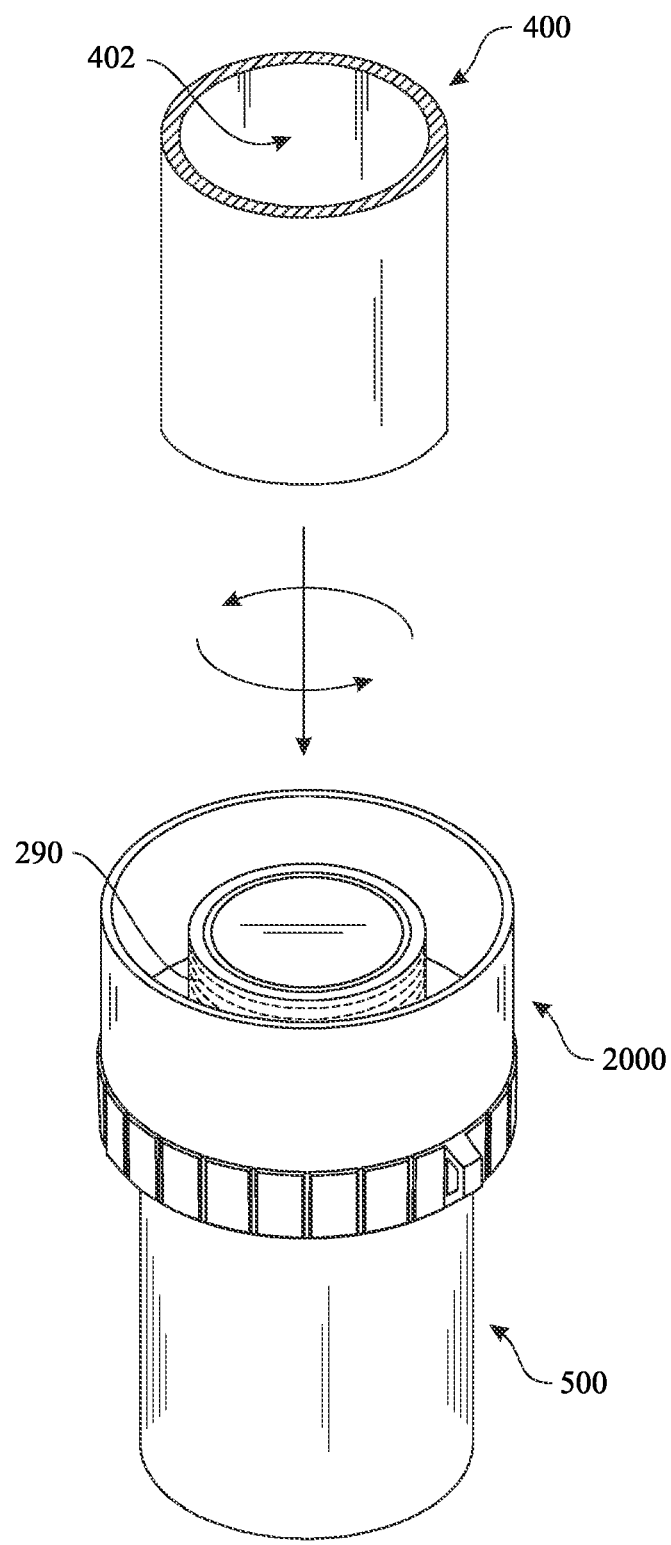
FIG. 17 is a raised perspective view of the alternative embodiment illustrating deployment of the internal priming unit relative to a pipe section in preparation for installation therein.

Referring now to FIGS. 16-20, during deployment of the first priming tool unit 2000, the sleeve shaped-applicator 206 is annularly located over the cylindrical male member 204 of container 202 (FIG. 16). The primer supply canister is 500 is attached to container 202 at bottom 207. The primer material in canister 500 can be transferred to tool unit 2000, for example, by inverting the combination of canister 500 and tool unit 2000 and shaking it in a longitudinal direction. The effect of such a transfer process is to fill the interior chamber space 230 of cylindrical male member 204 with primer material. Additionally, due to apertures 270 formed in male member 204, primer material is able to flow out of chamber space 230 and contact applicator 206 at its inner surface 280 where it is absorbed in applicator 206, eventually migrating to the outer surface 282 of applicator 206 and forming a film or layer of primer material 290 in the annular space surrounding applicator 206 (FIGS. 17 and 19).

Figure 20:
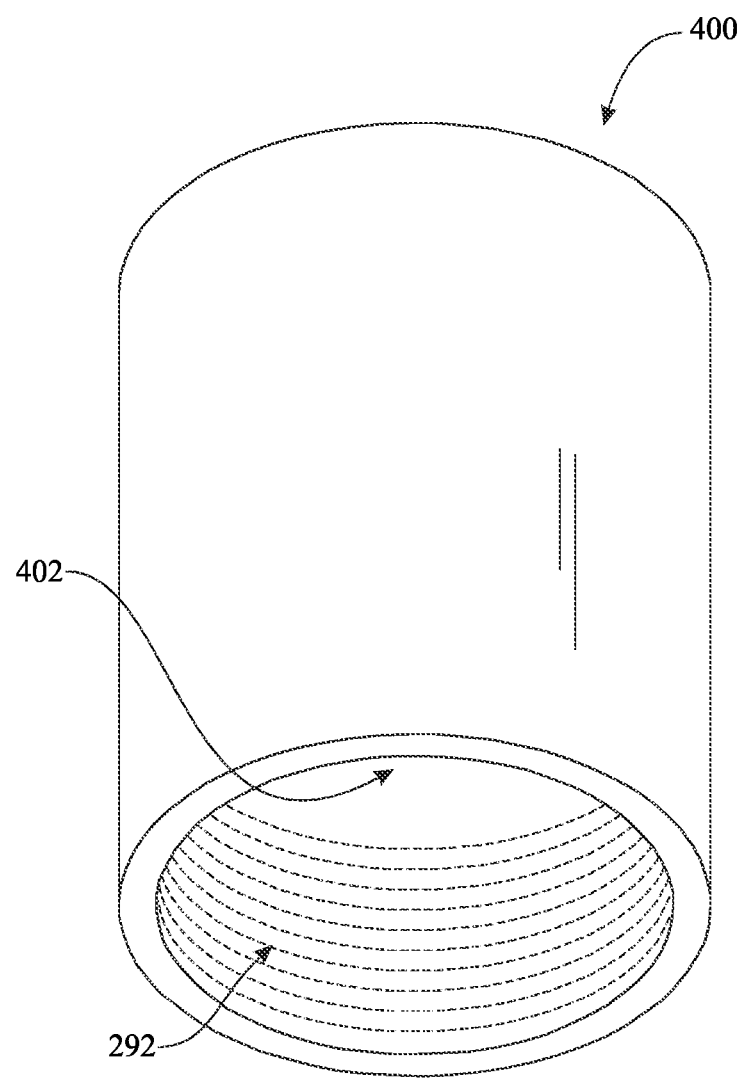
FIG. 20 is a lowered perspective view of an exemplary pipe section showing primer material applied to its interior surface.

Continuing with the operating sequence, the pipe section 400 is axially maneuvered into position over the nesting combination of cylindrical male member 204 and sleeve-shaped applicator 206 (FIGS. 17 and 18), placing the interior surface 402 of pipe section 400 into opposition with the outer surface 282 of applicator 206. A back-and-forth rotation of pipe section 400 then facilitates the transfer of primer material from the primer material film 290 (disposed annularly about applicator 206) to the interior surface 402 of pipe section 400, leaving a residue of primer material coating 292 on interior pipe surface 402 (FIG. 20). As best shown in FIG. 19, the size and dimensions of cylindrical male member 204 and sleeve-shaped applicator 206 are suitably chosen to accommodate the telescoped positioning of pipe section 400 over this nested combination. Additionally, an adequate gap or clearance radially outward of applicator 206 is needed to accommodate the build-up of the primer material film 290. A further space is needed so that pipe section 400 can fit over applicator 206 and remain in sufficient contact with film 290 to facilitate the application of primer material to the interior pipe surface 402. Because the apertures 270 are distributed throughout the sidewall 272 of male member 204, the primer material film 290 is able to form a continuous layer, especially once pipe section 400 is twisted back-and-forth and primer material is spread around.

Referring now to FIGS. 21-25, with continuing reference to FIG. 12, the second external priming tool unit 300 includes, in combination, a container 302, a cylindrical female member 304, and a selectively removable, sleeve-shaped applicator 306. In the assembled arrangement, as discussed further, sleeve-shaped applicator 306 is located within cylindrical female member 304 in a concentric, nesting configuration. During deployment of tool unit 300, a pipe section 400 is concentrically located within applicator 306.

The container 302 includes a body 310, a bottom 312, and an open top 314. In a preferred form, the body 310 of container 302 has a cylindrical shape. The cylindrical female member 304 extends axially from a closed lower end or base 320 proximate container bottom 312 and terminates at an open upper end 322, providing an exemplary cross-sectional profile of an upright U-shape. The body 310 includes a main portion or cylindrical sidewall 331 that transitions at a shoulder area 332 to define a downwardly-depending, axially-extending cylindrical sidewall 333 of the cylindrical female member 304. At a lower end of cylindrical female member 304, sidewall 333 transitions at a shoulder 334 to form a lower section 335 of the closed lower end 320 of female member 304, which then transitions at a shoulder 336 to form an upper section 337 of closed lower end 320 that is raised or elevated relative to lower section 335. The transition, at shoulder 336, from lower section 335 to upper section 337 of closed lower end 320 defines a circular seat having a step-like, graded profile generally illustrated at 338 formed at an inner side 339 of closed lower end 320, which as discussed further facilitates the location and seating of applicator 306.

The cylindrical female member 304 is centrally located within container 302 and preferably forms an integral, one-piece construction with container 302. The female member 304 defines a hollow interior space or chamber 330, closed at its lower end 320 and open at its upper end 322. The sleeve-shaped applicator 306 is a separate, removable piece that can be selectively located within female member 304. In this assembled configuration, sleeve-shaped applicator 306 is axially positioned within female member 304 in a nested, concentric relationship, so that female member 304 is annularly disposed about applicator 306. Applicator 306 includes a circular, open-faced, radially-inward notch or groove generally illustrated at 307 formed at a lower end of applicator 306. This circular notch 307 formed in applicator 306 has a geometry that is complementary to the geometry of the stepped, circular seat 338 formed in the lower end 320 of female member 304. During installation, applicator 306 is located within container 302 by inserting the sleeve-shaped applicator 306 into female member 304 and seating applicator 306 on the closed lower end 320 of female member 304. In particular, applicator 306 is maneuvered into place so that its circular notch 307 is seated on the stepped, circular seat 338 formed in the lower end 320 of female member 304. In this position, an axially outward edge 308 of applicator 306 is seated on lower section 335 of lower end 320 (at inner side 339) of female member 304, while an axially inward edge 309 of applicator 306 is seated on upper section 337 of lower end 320 (at inner side 339). In this seating relationship, applicator 306 is held in a stable position within the cylindrical female member 304.

The bottom 312 of container 302 is adapted in a manner similar to bottom 207 of container 202 of first priming tool unit 2000, with regard to providing an interface that permits primer supply canister 500 to mate with container 302 at bottom 312 and so facilitate the transfer of primer material from canister 500 into container 302. In particular, the bottom 312 of container 302 includes a circular recess 340 formed in lower side 342 of bottom 312 (similar to recess 240 of first tool unit 2000). The bottom 312 of container 302 is further configured with a central opening 344 formed at the lower side 342 of bottom 312 (similar to opening 244 of first tool unit 2000).

The cylindrical female member 304 of tool unit 300 is provided with a set of apertures 370 formed in and through its sidewall 333. The apertures 370 are distributed throughout sidewall 333. The sleeve-shaped applicator 306 is located within the cylindrical female member 304 in a concentric, nesting relationship so that female member 304 is disposed annularly about applicator 306. In this nesting configuration between female member 304 and sleeve-shaped applicator 306, an outer surface 382 of applicator 306 faces the set of apertures 370 formed in sidewall 333 of female member 304.

A means is provided in second priming tool unit 300 to provide a fluid pathway between opening 344 formed in container bottom 312 and the set of apertures 370 formed in sidewall 333 of cylindrical female member 304, so that primer material supplied through opening 344 (via primer supply canister 500) can reach apertures 370. In particular, a gap or clearance is defined between sidewall 333 of female member 304 and body 310 of container 302, defining an annular space 383 disposed in fluid communication with apertures 370 formed in sidewall 333 of female member 304. The central opening 344 formed in container bottom 312 is provided in fluid communication with annular space 383 disposed about female member 304 via an interior transition space or cavity generally illustrated at 384. The space between the closed lower end 320 of cylindrical female member 304 and wall 313 defining container bottom 312 is generally hollowed out to form transition cavity 384. Any suitable form or configuration can be used to define cavity space 384. The apertures formed in sidewall 333 of cylindrical female member 304 define a fluid communication path between annular space 383 (disposed about female member 304) and the installed applicator 306 (at its outer surface 382). Consequently, primer material entering container 302 via bottom opening 344 will first fill or supply transition cavity space 384, next enter annular space 383 disposed about female member 304, then next flow through apertures 370 formed in sidewall 333 of female member 304, and finally reach applicator 306 at its outer surface 382.

The applicator 306 is preferably made of a suitable absorbent material (similar to applicator 206 of first tool unit 2000) that permits a transfer or exchange of primer material from its outer surface 382 (adjacent cylindrical female member 304) to its inner surface 380 (adjacent the exterior surface 404 of pipe section 400 during use). The second tool unit 300 is also provided with a nut 352 and plug bolt 362 (not shown), similar to the combination of nut 252 and plug bolt 262 in the first tool unit 2000, in order to selectively seal container 302 at its bottom opening 344. Moreover, the connection of primer supply canister 500 to the second tool unit 300, and the manner in which primer material is supplied to second tool unit 300, is similar to that between supply canister 500 and the first tool unit 2000.

Figure 21:
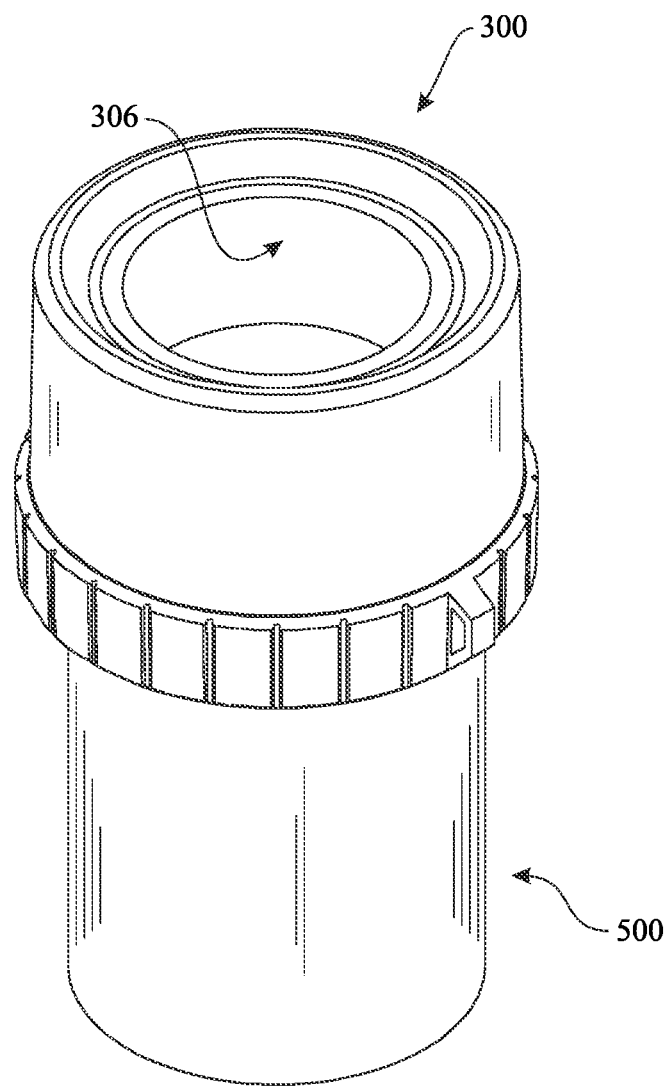
FIG. 21 is a raised perspective view of the alternative embodiment in its assembled configuration and removably attached to a primer supply source.
Figure 22:
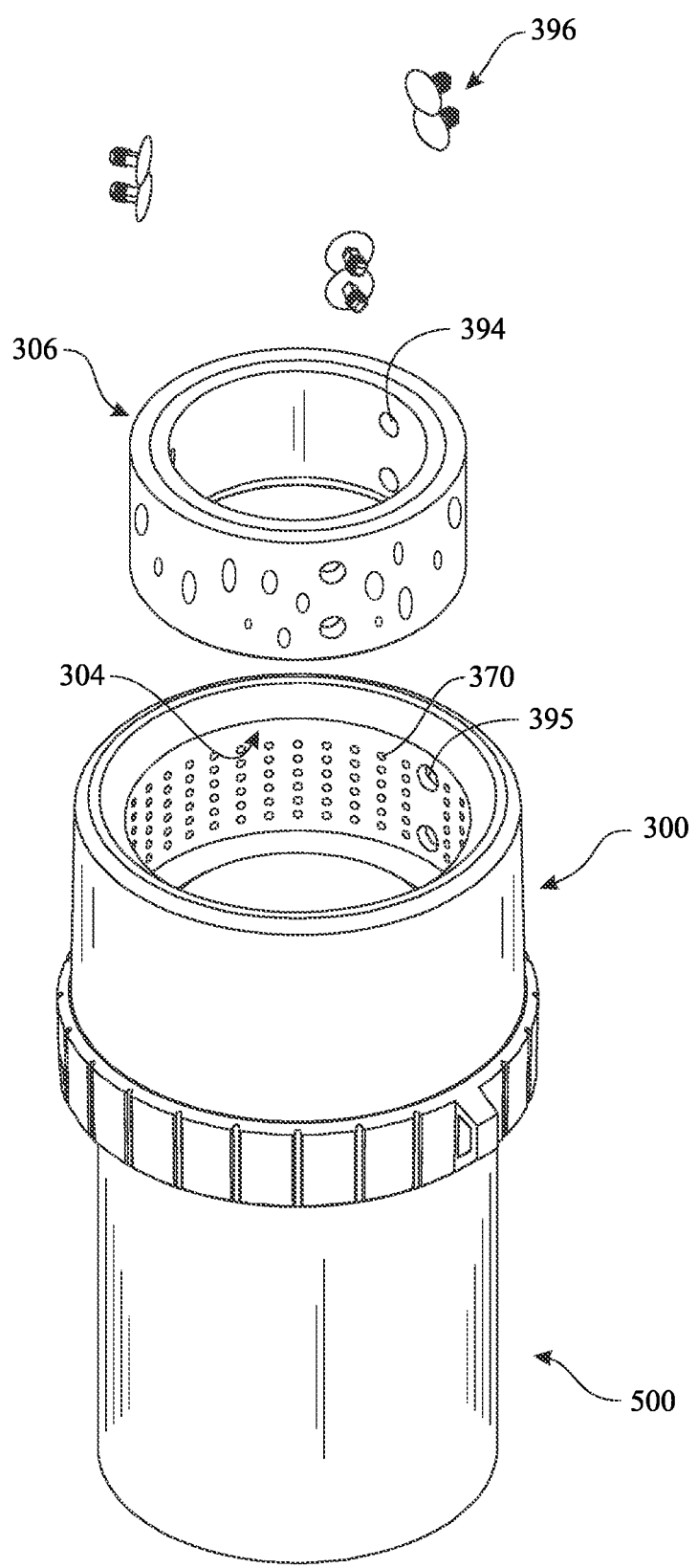
FIG. 22 is a partially exploded raised perspective view of the alternative embodiment showing the application removed from the external priming unit of the priming tool.
Figure 23:
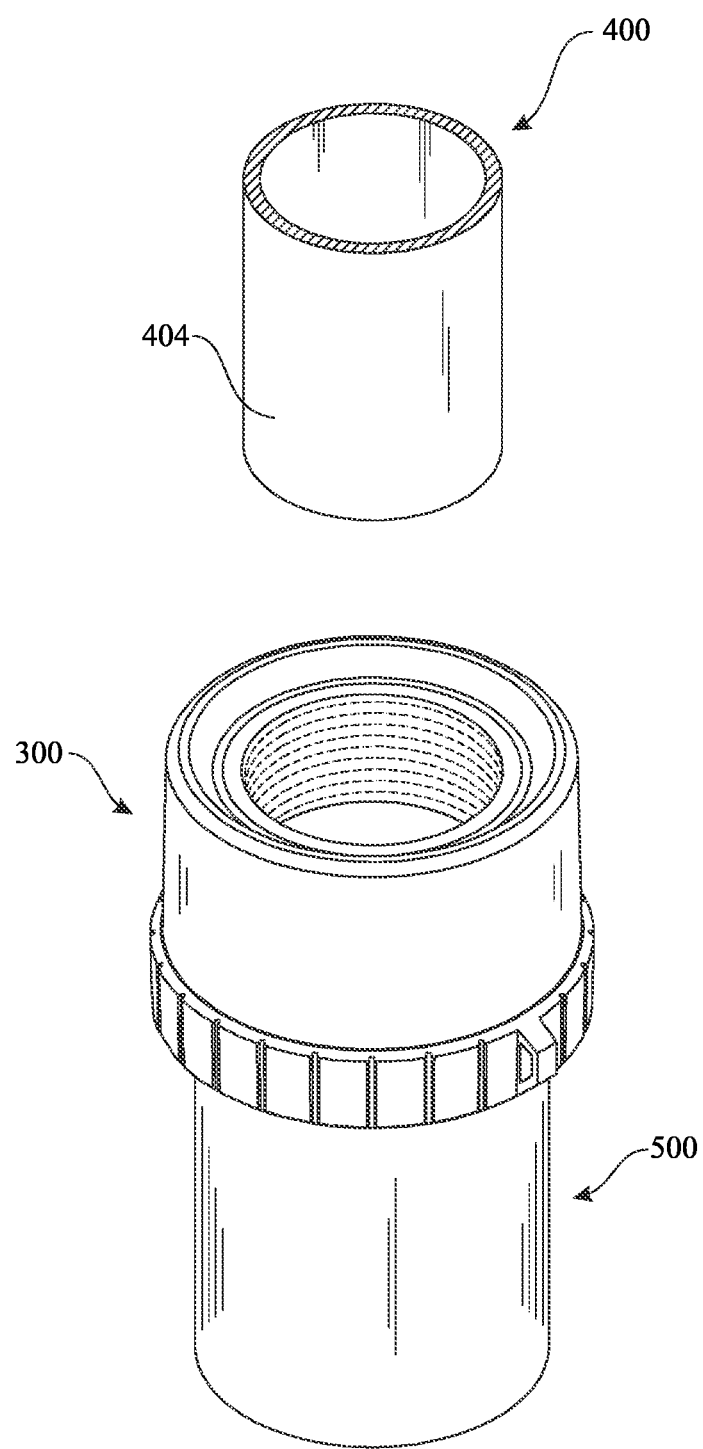
FIG. 23 is a raised perspective view of the alternative embodiment showing the external priming unit being deployed relative to a pipe section in preparation for installation therein.
Figure 24:
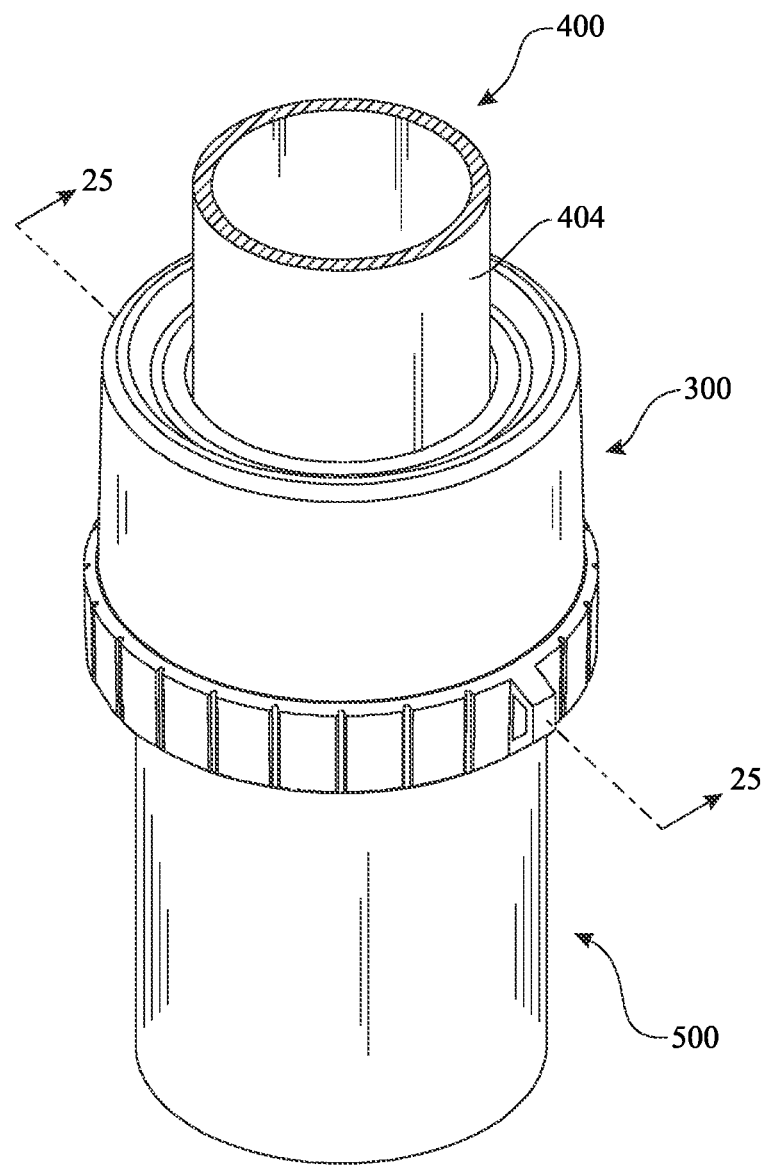
FIG. 24 is a raised perspective view of the alternative embodiment showing the pipe section of FIG. 23 installed in the external priming unit during use.
Figure 25:
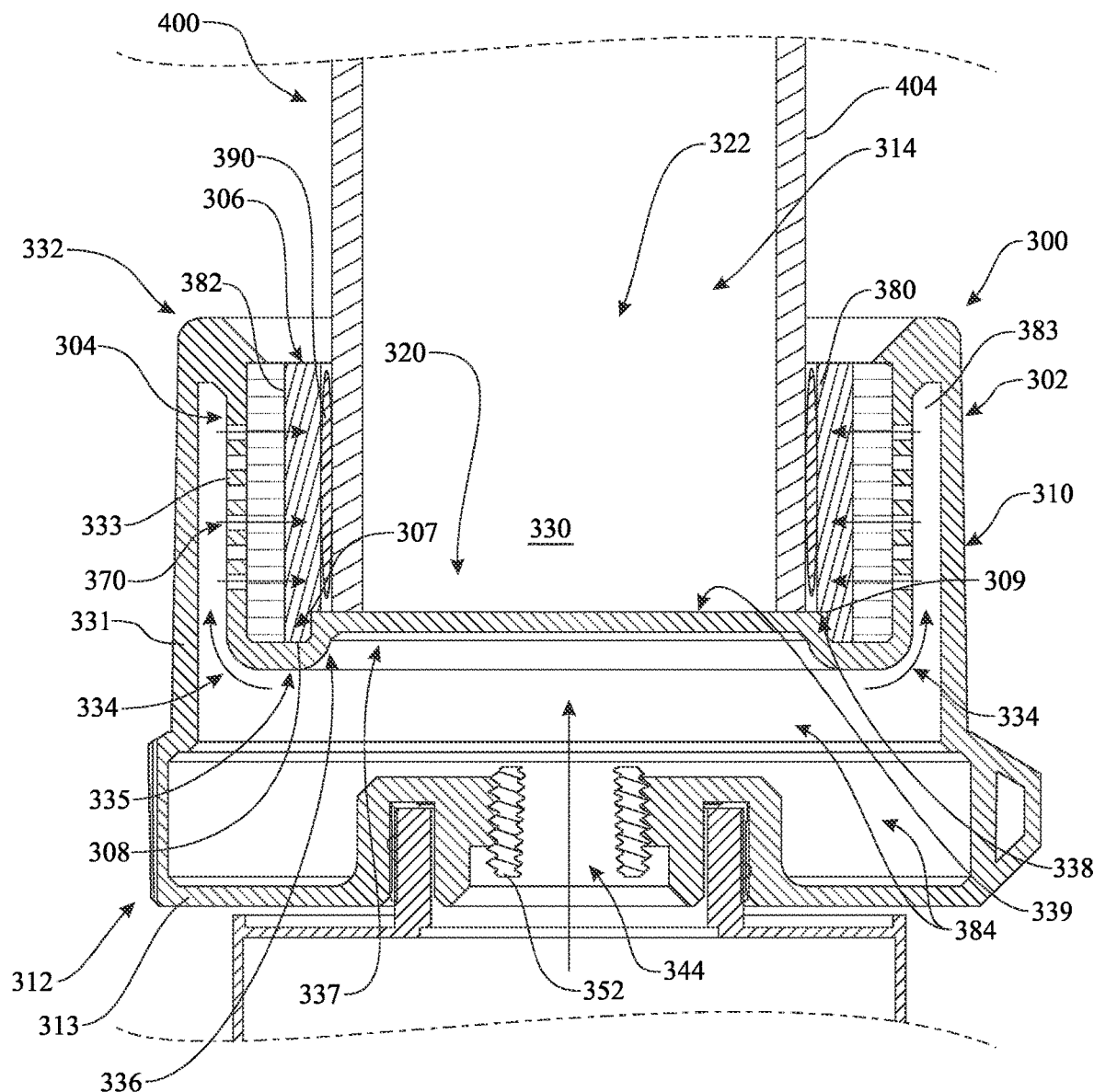
FIG. 25 is a cross-sectional view of the alternative embodiment taken along line 25-25 of FIG. 23.

Referring now to FIGS. 21-25, during deployment of the second priming tool unit 300, the sleeve shaped-applicator 306 is concentrically, axially located inside the cylindrical female member 304 of container 302 in a nesting configuration (FIG. 21). Next, pipe section 400 is axially positioned within applicator 306, so that its exterior surface 404 faces the inner surface 380 of applicator 306 (FIGS. 23-25). In order to facilitate a secure attachment of applicator 306 to the cylindrical female member 304, so that applicator 306 remains stable during the priming operation, a selective attachment feature is incorporated into priming tool unit 300 (FIG. 22). The attachment feature includes a set of holes 394 formed in the circumferential periphery of applicator 306 that align, during installation, with a corresponding set of threaded holes 395 formed in the circumferential periphery of cylindrical female member 304. A set of fastener screws 396 are inserted through the set of holes 394 formed in applicator 306 and then threaded into holes 395 formed in cylindrical female member 304, thus securely attaching applicator 306 to female member 304.

The primer material in canister 500 can be transferred to second tool unit 300 in a manner similar to that involving first tool unit 2000. The effect of such a transfer process is to first supply the interior transition cavity space 384 with primer material, which then communicates to the annular space 383 about female member 304. Due to the apertures 370 formed in female member 304, primer material located in the annular space 383 communicates to applicator 306 at its outer surface 382, where it is absorbed in applicator 306, eventually migrating to the inner surface 380 of applicator 306 and forming a film or layer of primer material 390 in the annular space defined between the inner surface 380 of applicator 306 and the exterior surface 404 of pipe section 400 (FIG. 25).

A back-and-forth rotation of pipe section 400 then facilitates the transfer of primer material from the primer material film 390 (disposed at the inner surface of applicator 306) to the exterior surface 404 of pipe section 400, leaving a residue of primer material coating on the exterior pipe surface 404. As best shown in FIG. 25, the size and dimensions of cylindrical female member 304 and sleeve-shaped applicator 306 are suitably chosen to accommodate the telescoped positioning of pipe section 400 into this nested combination. Additionally, an adequate gap or clearance radially inward of applicator 306 is needed to accommodate the buildup of the primer material film 390. A further space is needed so that pipe section 400 can fit inside applicator 306 and remain in sufficient contact with film 390 to facilitate the application of primer material to the exterior pipe surface 404. Because the apertures 370 are distributed throughout the sidewall 333 of female member 304, the primer material film 390 is able to form a continuous layer, especially once pipe section 400 is twisted back-and-forth and primer material is spread around.

Referring now to FIGS. 11-13, a feature of priming tool combination 1000 is that the first internal priming tool unit 2000 and the second external priming tool unit 300 can be assembled together in a packaging or storage configuration as a single, compact transportable module. For this purpose, the first tool unit 2000 and second tool unit 300 are suitably accommodated so that the cylindrical male member 204 of first tool unit 2000 can be nested inside the cylindrical female member 304 of second tool unit 300. For example, in order to provide such an accommodation, the diameter of cylindrical male member 204 is smaller than a diameter of cylindrical female member 304, and a diameter of container 202 is larger than a diameter of 302. Thus, there is nesting between the respective containers 202, 302 and between the cylindrical male member 204 of first unit 2000 and the cylindrical female member 304 of second unit 300. Although not presently shown, the cylindrical male member 204 of the first tool unit 2000 and the cylindrical female member 304 of the second tool unit 300 may include an adjustment mechanism that changes the diameter size of each respective member to better coincide with the interior and exterior surface of the pipe being lined with a substance. It should also be readily understood that the unit combination 1000 may also be used to apply an adhesive layer to the interior and exterior surface of a pipe instead of a primer. In the instant case that the unit combination is used to apply an adhesive to the exterior or interior surface of a pipe instead of a primer, it is contemplated that the shaped applicator used to apply the material be made out of a dense, rougher material than is otherwise necessary to apply the primer.

Although the invention has been explained in relation to its preferred embodiment, it is to be understood that many other possible modifications and variations can be made without departing from the spirit and scope of the invention as hereinafter claimed.

What is claimed is:

1. A lateral applicator kit for a pipe comprising:
a first application unit;
a second application unit;
the first application unit comprising a first unit housing, a supply engagement feature, and an application receptacle;
the application receptacle comprising at least one perforated annular wall and a solid base;
the supply engagement feature being integrated into the first unit housing;
the application receptacle being integrated into the first unit housing, opposite the supply engagement feature;
the at least one perforated annular wall being perimetrically positioned to the solid base;
the supply engagement feature being in fluid communication with the at least one perforated annular wall through the first unit housing;
the second application unit comprising a supply receptacle, an annular distributing container, and at least one spout set;
the annular distributing container being laterally connected to the supply receptacle;
the at least one spout set being positioned around the supply receptacle; and
the supply receptacle being in fluid communication with the at least one spout set through the annular distributing container.

2. The lateral applicator kit for a pipe as claimed in claim 1 comprising:
the first application unit and the second application unit each having radial geometry concentrically positioned about a central axis.

3. The lateral applicator kit for a pipe as claimed in claim 1 comprising:
the first application unit comprising a first unit application sleeve;
the second application unit comprising a second unit application sleeve;
the first unit application sleeve being removably positioned perimetrically within one of the at least one perforated annular wall; and
the second unit application sleeve being removably positioned around the annular distributing container.

4. The lateral applicator kit for a pipe as claimed in claim 1 comprising:
the first unit housing comprising a top, a bottom, and an outer shell;
the outer shell being perimetrically connected between the top and the bottom;
the application receptacle being integrated into the top; and
the supply engagement feature being integrated into the bottom.

5. The lateral applicator kit for a pipe as claimed in claim 4 comprising:
the supply engagement feature comprising a supply opening, an internal threading, and an annular recess;
the internal threading being integrated into the bottom;
the supply opening traversing through the internal threading; and
the annular recess traversing into the bottom, around the internal threading.

6. The lateral applicator kit for a pipe as claimed in claim 1 comprising:
the first application unit further comprising a reservoir cavity;
the reservoir cavity being positioned within the first unit housing; and
the supply engagement feature being in fluid communication with the application receptacle through the reservoir cavity.

7. The lateral applicator kit for a pipe as claimed in claim 1 comprising:
the first application unit further comprising a supply cavity and a reservoir cavity;
the supply cavity being positioned between the supply engagement feature and the solid base; and the supply cavity being in fluid communication with the reservoir cavity.

8. The lateral applicator kit for a pipe as claimed in claim 1 comprising:
the at least one perforated annular wall of the application receptacle comprising a first perforated annular wall and a second perforated annular wall;
the first perforated annular wall having a larger diameter than the second perforated annular wall;
the first perforated annular wall being perimetrically connected to a top of the first unit housing; and
the second perforated annular wall being perimetrically connected between the first perforated annular wall and the solid base.

9. The lateral applicator kit for a pipe as claimed in claim 1 comprising:
the second application unit further comprising a base and an outer lateral wall;
the outer lateral wall being perimetrically connected to the base; and
the outer lateral wall having a larger diameter than an outer shell of the first unit housing, wherein the outer lateral wall of the second application unit is configured to sleeve the outer shell of the first application unit.

10. The lateral applicator kit for a pipe as claimed in claim 1 comprising:
the second application unit further comprising a base and a supply opening;
the supply receptacle being concentrically connected to the base;
the supply opening traversing through the base into the supply receptacle; and
the annular distributing container being concentrically connected to the base around the supply receptacle.

11. The lateral applicator kit for a pipe as claimed in claim 1 comprising:
the at least one spout set comprising a first spout set, a second spout set, and a third spout set;
the first spout set traversing between the supply receptacle and the annular distributing container;
the second spout set traversing through the annular distributing container; and
the third spout set traversing through the supply receptacle.

12. The lateral applicator kit for a pipe as claimed in claim 1 comprising:
the annular distributing container comprising at least one distributing wall; and
each of the at least one distributing wall being connected to a base of the second application unit around the supply receptacle.

13. The lateral applicator kit for a pipe as claimed in claim 1 comprising:
the annular distributing container comprising a distributing lateral wall, a annular connecting member, and an annular cavity;
the distributing lateral wall being connected to a base of the second application unit around the supply receptacle;
the annular connecting member being connected between the distributing lateral wall and the supply receptacle opposite a base of the second application unit along the distributing lateral wall;
the annular cavity being positioned between the supply receptacle and the distributing lateral wall;
a first spout set from the at least one spout set traversing through the supply receptacle into the annular cavity;
a second spout set from the at least one spout set traversing through the distributing lateral wall into the annular cavity; and
a third spout set from the at least one spout set traversing through the supply receptacle, from the base, through the annular connecting member.

\* \* \* \* \*